US012051178B2

(12) United States Patent
Tan et al.

(10) Patent No.: US 12,051,178 B2
(45) Date of Patent: Jul. 30, 2024

(54) IMAGE HARMONIZATION FOR DEEP LEARNING MODEL OPTIMIZATION

(71) Applicant: GE Precision Healthcare LLC, Wauwatosa, WI (US)

(72) Inventors: Tao Tan, Eindhoven (NL); Pál Tegzes, Budapest (HU); Levente Imre Török, Budapest (HU); Lehel Ferenczi, Dunakeszi (HU); Gopal B. Avinash, San Ramon, CA (US); László Ruskó, Budapest (HU); Gireesha Chinthamani Rao, Pewaukee, WI (US); Khaled Younis, Parma Heights, OH (US); Soumya Ghose, Niskayuna, NY (US)

(73) Assignee: GE PRECISION HEALTHCARE LLC, Waukesha, WI (US)

(*) Notice: Subject to any disclaimer, the term of this patent is extended or adjusted under 35 U.S.C. 154(b) by 0 days.

(21) Appl. No.: 18/304,947

(22) Filed: Apr. 21, 2023

(65) Prior Publication Data

US 2023/0252614 A1 Aug. 10, 2023

Related U.S. Application Data

(62) Division of application No. 16/858,862, filed on Apr. 27, 2020, now Pat. No. 11,669,945.

(51) Int. Cl.
*G06T 5/50* (2006.01)
*G06F 18/21* (2023.01)
(Continued)

(52) U.S. Cl.
CPC .............. *G06T 5/50* (2013.01); *G06F 18/214* (2023.01); *G06F 18/217* (2023.01); *G06F 18/22* (2023.01);
(Continued)

(58) Field of Classification Search
CPC . G06T 5/50; G06T 7/00; G06F 18/214; G06F 18/217; G06F 18/22; G06F 18/23;
(Continued)

(56) References Cited

U.S. PATENT DOCUMENTS

| 2018/0260668 A1 | 9/2018 | Shen et al. |
| 2020/0013188 A1* | 1/2020 | Nakashima ............ G06N 3/045 |
| 2022/0292654 A1 | 9/2022 | Zhang et al. |

OTHER PUBLICATIONS

Philipsen et al., "Localized Energy-Based Normalization of Medical Images: Application to Chest Radiography," IEEE Transactions on Medical Imaging, vol. 34, No. 9, Sep. 2015, 2 pages.
(Continued)

*Primary Examiner* — John B Strege
(74) *Attorney, Agent, or Firm* — Amin, Turocy & Watson, LLP

(57) ABSTRACT

Techniques are described for optimizing deep learning model performance using image harmonization as a preprocessing step. According to an embodiment, a method comprises decomposing, by a system operatively coupled to a processor, an input image into sub-images. The method further comprises harmonizing the sub-images with corresponding reference sub-images of at least one reference image based on two or more different statistical values respectively calculated for the sub-images and the corresponding reference-sub images, resulting in transformation of the sub-images into modified sub-images images. In some implementations, the modified sub-images can be combined into a harmonized image having a more similar appearance to the at least one reference image relative to the input image. In other implementations, harmonized images and/or modified sub-images generated using these techniques can be used as ground-truth training samples for training one or more deep learning model to transform input images with appearance variations into harmonized images.

20 Claims, 18 Drawing Sheets

(51) Int. Cl.

| | |
|---|---|
| *G06F 18/214* | (2023.01) |
| *G06F 18/22* | (2023.01) |
| *G06F 18/23* | (2023.01) |
| *G06F 18/28* | (2023.01) |
| *G06T 7/00* | (2017.01) |
| *G06V 10/74* | (2022.01) |
| *G06V 10/762* | (2022.01) |
| *G06V 10/772* | (2022.01) |
| *G06V 10/774* | (2022.01) |
| *G06V 10/776* | (2022.01) |
| *G06V 10/82* | (2022.01) |

(52) U.S. Cl.
CPC .............. *G06F 18/23* (2023.01); *G06F 18/28* (2023.01); *G06T 7/00* (2013.01); *G06V 10/761* (2022.01); *G06V 10/762* (2022.01); *G06V 10/772* (2022.01); *G06V 10/774* (2022.01); *G06V 10/776* (2022.01); *G06V 10/82* (2022.01)

(58) Field of Classification Search
CPC .... G06F 18/28; G06V 10/761; G06V 10/762; G06V 10/772; G06V 10/774; G06V 10/776; G06V 10/82
See application file for complete search history.

(56) References Cited

OTHER PUBLICATIONS

Burt et al., "The Laplacian Pyramid as a Compact Image Code", IEEE Transactions on Communications, vol. Com-31, No. 4, Apr. 1983, 9 pages.

Philipsen et al., "Localized Energy-Based Normalization of Medical Images: Application to Chest Radiography", IEEE, Transactions on Medical Imaging, 2015, 12 pages.

Tan et al., "Improve the Effectiveness of Deep Learning in Chest X-ray Using Image Harmonization", GEHC Data Science Symposium, 2019, 3 pages.

Isola et al., "Image-to-Image Translation with Conditional Adversarial Networks", arXiv:1611.07004v3 [cs.CV], Nov. 26, 2018, 17 pages.

Zhu et al., "Unpaired Image-to-Image Translation using Cycle-Consistent Adversarial Networks", arXiv:1703.10593v6 [cs.CV], Nov. 15, 2018, 18 pages.

Dewey et al., "Deep Harmony: A Deep Learning Approach to Contrast Harmonization Across Scanner Changes", Magnetic Resonance Imaging, vol. 64, 2019, 12 pages.

International Search Report and Written Opinion received for PCT Application Serial No. PCT/US2021/024037 dated Jun. 22, 2021, 20 pages.

Yang et al., "Unbiased Histogram Matching Quality Measure for Optimal Radiometric Normalization", ASPRS Annual Conference, 2007, 12 pages.

Non-Final Office Action received for U.S. Appl. No. 16/858,862, dated Oct. 28, 2022, 42 pages.

Vidya et al., "Local and Global Transformations to Improve Learning of Medical Images Applied to Chest Radiographs", Proceedings of Society of Photo-Optical Instrumentation Engineers, vol. 10949, 2019, 10 pages.

Notice of Allowance received for U.S. Appl. No. 16/858,862, dated Jan. 23, 2023, 14 pages.

U.S. Appl. No. 16/858,862, filed Apr. 27, 2020.

Forrest et al., "Radiologic Errors in Patients with Lung Cancer", Western Journal of Medicine, vol. 134, Jun. 1981, pp. 485-490.

Quekel et al., "Miss Rate of Lung Cancer on the Chest Radiograph in Clinical Practice", Chest, vol. 115, Mar. 1999, pp. 720-724.

Tudor et al., "An Assessment of Inter-observer Agreement and Accuracy when Reporting Plain Radiographs", Clinical Radiology, vol. 52, Mar. 5, 1997, pp. 235-238.

Melendez et al., "An Automated Tuberculosis Screening Strategy Combining X-Ray-based Computer-aided Detection And Clinical Information", Scientific Reports, vol. 6, No. 25265, Apr. 29, 2016, 9 pages.

Hoog et al., "High Sensitivity of Chest Radiograph Reading by Clinical Officers in a Tuberculosis Prevalence Survey", International Journal of Tuberculosis and Lung Disease, vol. 15, No. 10, 2011, pp. 1308-1314.

Pande et al., "Computer-aided Detection of Pulmonary Tuberculosis on Digital Chest Radiographs: A Systematic Review", International Journal of Tuberculosis and Lung Disease, vol. 20, No. 9, 2016, pp. 1226-1230.

Chen et al., "Rotation and Gray Scale Transform Invariant Texture Identification Using Wavelet Decomposition and Hidden Markov Model", IEEE Transactions on Pattern Analysis and Machine Intelligence, vol. 16, No. 2, Feb. 1994 pp. 208-214.

Wu et al., "Rotation and Gray-scale Transform-invariant Texture Classification Using Spiral Resampling, Subband Decomposition, and Hidden Markov Model", IEEE Transactions on Image Processing, vol. 5, No. 10, 1996, pp. 1423-1434.

Pan et al., "A Survey on Transfer Learning", IEEE Transactions on Knowledge and Data Engineering, vol. 22, No. 10, Oct. 2010, pp. 1345-1359.

Arzhaeva et al., "Dissimilarity-based Classification in the Absence of Local Ground Truth: Application to the Diagnostic Interpretation of Chest Radiographs", Pattern Recognition, vol. 42, 2009, pp. 1768-1776.

\* cited by examiner

IMAGE HARMONIZATION FOR DEEP LEARNING MODEL OPTIMIZATION

The subject patent application is a divisional of, and claims priority to, U.S. patent application Ser. No. 16/858,862, filed Apr. 27, 2022, and entitled "IMAGE HARMONIZATION FOR DEEP LEARNING MODEL OPTIMIZATION."

TECHNICAL FIELD

This application relates to image harmonization techniques for deep learning model optimization.

BACKGROUND

Advancements in artificial intelligence (AI) and machine learning (ML) technologies, such as deep neural networks (DNN)s, have led to the development of AI/ML models that have shown impressive performance in medical image processing and analysis tasks like diagnosis, organ segmentation, anomaly detection, image reconstruction, and so on. Most often, these models are trained on images from a specific source domain. When applied to images that vary in appearance from the source domain images due to various factors (e.g., image capture protocol, dose usage, exposure setting, photon receiving materials, field-of-view (FOV), demography, contrast vs. non-contrast, etc.), model performance degradation is often observed. It is difficult and costly to adapt these models to accurately perform on images from other domains. Accordingly, efficient and effective techniques for maintaining or improving model performance on images with different appearance variations relative to the original training images are needed.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that provide image harmonization techniques for deep learning model optimization.

According to an embodiment, a system is provided that comprises a memory that stores computer executable components, and a processor that executes the computer executable components stored in the memory. The computer executable components can comprise an image decomposition component that decomposes an input image into sub-images, and a harmonization component that harmonizes the sub-images with corresponding reference sub-images of at least one reference image based on two or more different characteristics respectively calculated for the sub-images and the corresponding reference-sub images, resulting in transformation of the sub-images into modified sub-images images. In some implementations, the computer executable components can further comprise a reconstruction component that combines the modified sub-images into a harmonized image, the harmonized image having a more similar appearance to the at least one reference image relative to the input image.

In various implementations, the sub-images comprise energy band images and the reference sub-images comprise corresponding reference energy band images. With these implementations, wherein the two or more different characteristics can comprise statistical values selected from a group consisting of: means of the energy band images and the corresponding reference energy band images, standard deviations of the energy band images, percentiles of the energy band images, and histograms of the energy band images.

The computer executable computer executable components further comprise a reference image selection component that selects the at least one reference image from candidate reference images based on a degree of similarity between a first feature vector for the input image and a second feature vector of each reference image. In some implementations, the first feature vector and the second feature vector are respectively based on at least one statistical value of the two or more different statistical values. For example, in implementations in which the sub-images comprise energy band images and the reference sub-images comprise corresponding reference energy band images, the feature vectors can be based one or more statistical values such as but not limited to: means of the energy band images, standard deviations of the energy band images, percentiles of the energy band images, and histograms of the energy band images. Additionally, or alternatively, the first feature vector and the second feature vector can be respectively based on output features generated based on application of a deep learning neural network model to the input image and the at least one reference image, wherein the deep learning neural network model was trained on a corpus of images related to the input image and the at least one reference image.

In some implementations, the computer executable components can further comprise a vectorization component that generates feature vectors for candidate reference images, and reference image set generation component that selects a subset of the candidate reference images based on differences between the feature vectors. With these implementations, the reference image selection component can select the at least one reference image from the subset. For example, in one implementation, the computer executable components can further comprise a clustering component that clusters the candidate reference images into different groups based on the differences between the feature vectors, and the reference image set generation component can select one candidate reference image from each of the different groups for inclusion in the subset.

In one or more additional implementations, the computer executable components can further comprise a training component that uses the harmonized images as ground-truth training samples to facilitate training an image harmonization model to transform the input image into a harmonized image that has a more similar appearance to the at least one reference image relative to the new input image. The image harmonization model can comprise one or more machine learning models, such as deep learning neural network models and the like. For example, the image harmonization model can comprise a plurality of sub-image harmonization models that respectively transform new sub-images decomposed from the new input image into new modified sub-images. With these implementations, the reconstruction component can combine the new sub-images to generate the harmonized image.

In another embodiment, a system is provided that comprises a memory that stores computer executable components, and a processor that executes the computer executable components stored in the memory. The computer executable components can comprise decomposition component that decomposes training images into sub-images, and a harmonization component that harmonizes the sub-images with corresponding reference sub-images of reference images, resulting in transformation of the sub-images into modified sub-images. The training images can comprise images with different appearance variations representative of images from different domains. The computer executable components further comprise a reconstruction component that combines groups of the modified sub-images associated with respective training images of the training images to generate ground-truth harmonized images for the respective training images. The computer executable components further comprise a training component that trains a full-image harmonization model (i.e., an image harmonization model) to transform the training images into the ground-truth harmonized images. The computer executable components can further comprise a model application component that applies the (trained) full-image harmonization model to a new input image to transform the new input image into a new harmonized image that has a more similar appearance to the reference images relative to the new input image.

Additionally, or alternatively, another system is provided that comprises a memory that stores computer executable components, and a processor that executes the computer executable components stored in the memory. The computer executable components can comprise decomposition component that decomposes training images into sub-images, and a harmonization component that harmonizes the sub-images with corresponding reference sub-images of reference images, resulting in transformation of the sub-images into modified sub-images. In this case, the harmonized images can be images transformed using energy-band harmonization or images from the same imaging setting. The computer executable components further comprise a training component that trains sub-image harmonization models to transform the sub-images into the modified sub-images. The training images can comprise images with different appearance variations representative of images from different domains. The computer executable components can further comprise a model application component that applies the sub-image harmonization models to transform new sub-images decomposed from an input image into new modified sub-images, and a reconstruction component that combines the new modified sub-images to generate a harmonized image for the input image, the harmonized image having a more similar appearance to the reference images relative to the input image.

In some embodiments, elements described in the disclosed systems can be embodied in different forms such as a computer-implemented method, a computer program product, or another form.

DETAILED DESCRIPTION

Figure 1:
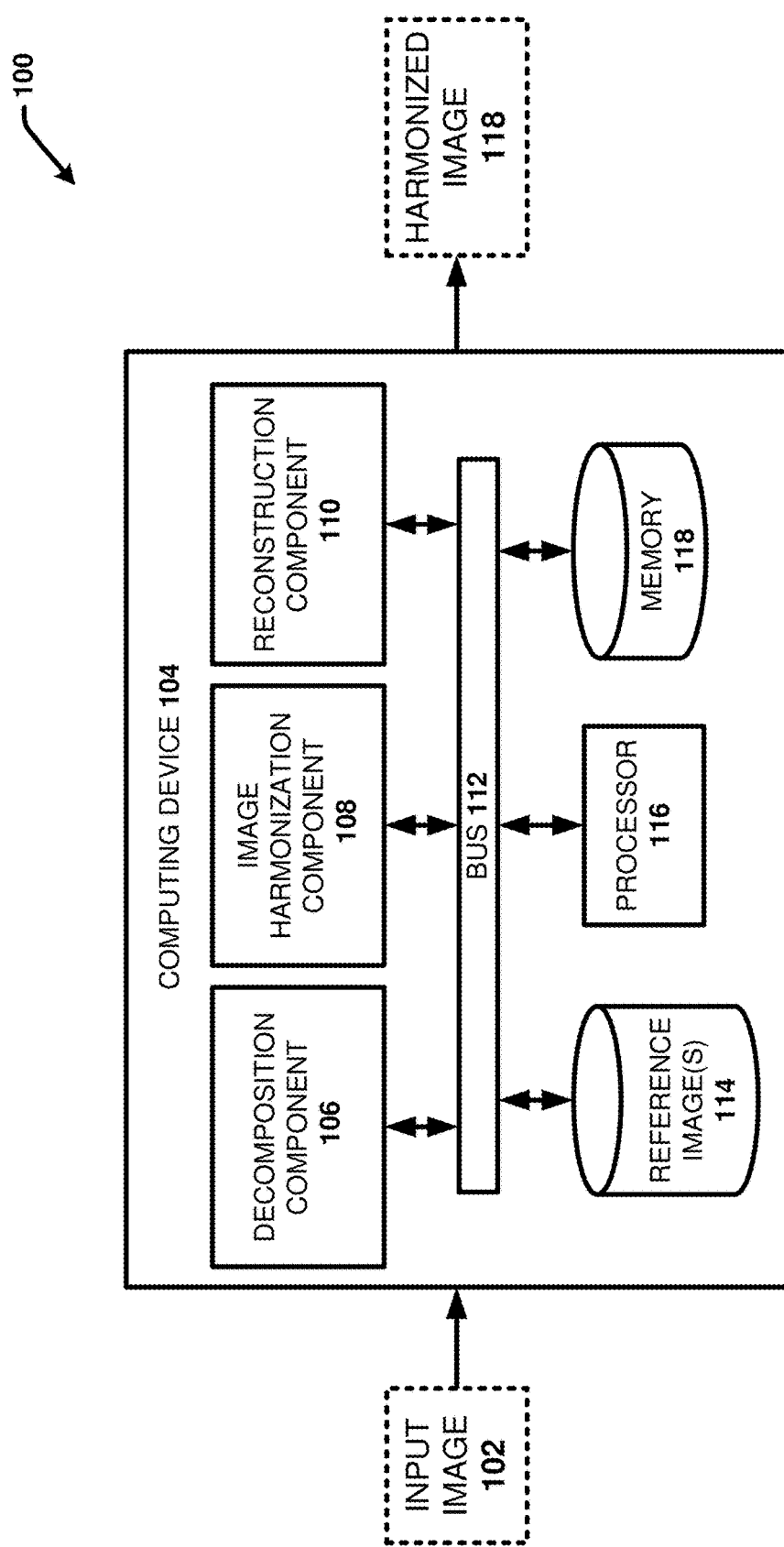
FIG. 1 illustrates a block diagram of an example, non-limiting system that facilitates image harmonization for deep learning model optimization in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed to systems, computer-implemented methods, apparatus and/or computer program products that provide various image harmonization techniques to facilitate optimizing the performance of AI/ML-based image processing models on images that vary in appearance relative to the training images. In the context of the disclosed subject matter, image harmonization refers to the adaptation of a given image to appear more similar to one or more reference images that are representative of the training images used to train a particular image processing model. For example, the one or more reference images can include one or more of the training images and/or one or more images that correspond to the training images The disclosed image harmonization techniques are independent of the trained model and correct the model prediction for an image from a different domain relative to the training images as a pre-processing step. In this regard, the disclosed image harmonization techniques can be applied to facilitate optimizing the performance of various types of image processing models configured to perform a variety of inferencing tasks.

In one or more non-limiting embodiments, the image processing models can include medical image processing models based on deep learning that are configured to perform various medical related inferencing tasks on medical images, such as image-based diagnosis, organ segmentation, anomaly detection, image reconstruction, and the like. For example, various deep-learning-based AI models have been proposed to interpret and prioritize chest X-ray/radiography (CXR) images, which are the most commonly used modality for screening and diagnosing various lung diseases such as pneumonia, lung cancer, tuberculosis and lung tissue scarring. However, quite often these regulated products are only authorized for usage with images captured using a specific chest X-ray system, as the appearance of CXR images can vary between different X-ray systems due to dose usage, exposure setting, photon receiving materials, and various other factors. These regulated AI models can be very sensitive to the change in images caused by these imaging factors which is also the case in general for deep-learning networks. Often a decrease in performance can be observed on image datasets which are different than the training dataset due to even minor appearance variations.

Thus, in the context of medical image processing model optimization, the disclosed image harmonization techniques can be used to adapt medical images that vary in appearance relative to the model training images to be more similar in appearance to the training images prior to input into the model. For example, the variational medical images can comprise medical images of a same type as the training images (e.g., CXR images) that vary in appearance to the training images owing to differences in the capture protocol/system used (e.g., which can vary between medical centers) or other imaging factors. The disclosed image harmonization techniques can also be applied to harmonize image datasets for AI/ML image analysis/processing models configured to perform various inferencing tasks on non-medical images.

In accordance with one or more embodiments, the disclosed image harmonization techniques involve decomposing an original image to be harmonized with a particular model's training dataset into sub-images and harmonizing the sub-images with corresponding reference sub-images decomposed from one or more reference images. In particular, the sub-images can be harmonized with the corresponding reference sub-images by adapting or modifying the sub-images to appear more similar to the corresponding reference sub-images, resulting in modified sub-images for the original image. In various embodiment the harmonization process can involve changing one or more features of each sub-image to make them more similar to the corresponding features of a corresponding reference sub-image. The modified sub-images can then be re-combined to generate a reconstructed, harmonized image that is a modified version of the original image having a more similar visual appearance to the one or more reference images relative to the original image.

In various embodiments, the decomposition involves decomposing the original image and the one or more reference images into different energy band images with different frequency ranges using a novel decomposition process that generates the sub-band images from a low pass signal. After the original image and the one or more reference images have been respectively decomposed into energy band images, each energy band of the original image can be harmonized with one or more corresponding reference energy band images by making one or more statistics of each energy band image similar to those of the one or more corresponding reference energy band images. For example, various statistical measures can be calculated or generated for each energy band image based on its energy band image intensity values, including but not limited to: the mean of its energy band image intensity values, the standard deviation of its energy band image intensity values, the percentiles of its energy band image intensity values, and a histogram of its energy band image intensity values. In this regard, harmonization of an energy band image for the original image with a corresponding reference energy band image can comprise modifying (e.g., with respect to a defined degree of change) intensity values of the energy band image such that the statistical measures of the energy band image intensity values are more similar to those of the corresponding reference energy band image.

In another embodiment, the decomposition of the original input image and the one or more reference images into sub-images can comprise segmenting the image into two or more different regions. For example, as applied to medical images, a medical image can be segmented into different regions (e.g. organs) of interest using a pre-trained segmentation model. In this regard, each segmented region can be considered a sub-image and will have different features (e.g., with respect to appearance features and/or spatial features). According to this embodiment, respective segmented regions for the original image can be harmonized with corresponding segmented regions of one or more reference images by making one or more features of the original image segments more similar to the corresponding features of the corresponding reference image segments. The modified segments of the original image can then be recombined to generate a harmonized image.

In various additional embodiments, the harmonized images and/or modified sub-images generated using the techniques described above can also be used as ground-truth training samples for training one or more ML/AI models to transform input images with appearance variations into harmonized images (e.g., harmonized with an image processing model's training dataset) prior to input into the image processing model. Such ML/AI models are referred to herein as image harmonization models. For example, the one or more image harmonization models can comprise one or more deep learning models, such an autoencoder, a generative adversarial autoencoder, a generative adversarial network (GAN), or the like. With these embodiments, once trained, the one or more image harmonization models can be used to transform new input images with different feature variations into harmonized images that have a more similar appearance to the original source training images.

For example, in some embodiments, the above described techniques for generating harmonized images can be applied to a set of image harmonization model training images having different appearance variations to generate harmonized images for each of the training images. An image harmonization model can then be trained to transform the training images into the harmonized images. Additional training images without ground-truth harmonized versions can also be added to the training dataset. Once the image harmonization model has been trained, the image harmonization model can be applied to transform new input images with feature variations relative to the original model training images into harmonized images.

Additionally, or alternatively, the groups of sub-image/modified sub-image pairs generated for each of the training images can be used to train separate sub-image harmonization models to map the sub-images to the corresponding modified sub-images. For example, assume the decomposition process decomposes each input image into a first pass energy band image, a second pass energy band image, a third pass energy band image, and so on up to a defined number (i) of passes. According to this example, a first sub-image harmonization model can be trained to transform the first pass energy band images into first modified sub-images, a second sub-image harmonization model can be trained to transform the second pass energy band images into second modified sub-images, and so on. Once trained, the sub-image harmonization models can be respectively applied to new first pass, second pass, third pass, etc. sub-images decomposed from a new input image to generate modified sub-images for the new input image. The modified sub-images can then be recombined to generate a harmonized image.

The disclosed techniques for developing and applying one or more image harmonization models provide a highly efficient end-to-end process for image harmonization as the mechanism for generating the ground-truth training data is automated. In this regard, one major limitation in ML/AI model development is the availability of ground-truth training data, which most often requires manual annotation, a tedious and costly endeavor. With the disclosed techniques, the ground-truth training data can be generated without any manual intervention, thus providing for limitless, low-cost, and efficient ground-truth training data generation. In addition, the usage of a trained image harmonization model to transform input images into harmonized images reduces the overall processing time for image harmonization relative to above described decomposition, sub-image harmonization and reconstruction process described above.

The disclosed subject matter further provides tools for enhancing the accuracy and effectiveness of the disclosed image harmonization techniques by optimizing reference image selection. In this regard, in some embodiments, a same, single, pre-selected reference image can be used to transform all variational images into harmonized images for input into a particular image processing model. In other embodiments multiple (e.g., two or more) reference images can be used. According to these embodiments, the sub-images decomposed from an input image can be harmonized with corresponding reference sub-images of the multiple reference images using a weighting scheme for the reference sub-images determined based on degrees of similarity between the input image and the respective reference images.

In various implementations, the degrees of similarly can be determined based on comparison of feature vectors respectively generated for the input image and the reference images. In some implementations, the feature vectors can be generated based on one or more of the statistical measures that will be used to harmonize the sub-images with the corresponding reference sub-images. For example, in implementations in which the images are decomposed into energy band images, the feature vectors can be generated based on one or more statistics of their respective energy band images (e.g., the means of the energy band image intensity values for each energy-band image, the standard deviations of the energy band image intensity values for each energy-band image, the percentiles of the energy band image intensity values for each energy-band image, etc.). Additionally, or alternatively, the feature vectors can be computed from the output features of one or more layers (e.g., the fully connected layer) of a pretrained network trained on a corpus of similar images (e.g., using an ImageNet dataset or the like). The feature vectors can also represent other image-based features (e.g., dose usage, exposure setting, photon receiving materials, FOV, demography, contrast vs. non-contrast, etc.) and/or non-image based features (e.g., patient specific features such as patient demographics, patient medical history, etc.) included in metadata associated with the respective images.

In some embodiments, the multiple reference images can include a select subset of the original model training images that provide a representative subset of the different types of variational images included in the training dataset. For example, in one or more implementations, feature vectors can be generated for all (or a smaller subset) of the training images. The training images can then be clustered into different groups of related images based on similarities and differences between their feature vectors (e.g., using a suitable clustering algorithm such as k-means clustering or the like). One or more representative reference images can then be selected from each (or in some implementations one or more) group to generate a set of reference images that are used for harmonization using a weighting scheme based on the degrees of similarity between the input image and the respective references images included in the set.

Additionally, or alternatively, a single reference image can be selected from amongst the set of reference images or the entire set of training images for each input image to be harmonized based on feature vector similarity. In this regard, the feature vector for the input image can be compared with the feature vectors of all of the candidate reference images to select a single candidate reference image that is the best match based on its feature vector having the greatest degree of similarity to the feature vector for the input image. This process can be performed for each input image such that the reference image used to harmonize each input image can be tailored to the input image.

The term "image processing model" is used herein to refer to an AI/ML model configured to perform an image processing or analysis task on images. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image processing models described herein can include two-dimensional image processing models (2D) as well as three-dimensional (3D) image processing models. The image processing model can employ various types of AI/ML algorithms, including (but not limited to): deep learning models, neural network models, deep neural network models (DNNs), convolutional neural network models (CNNs), and the like.

As used herein, a "medical imaging processing model" refers to an image processing model that is tailored to perform an image processing/analysis task on one or more medical images. For example, the medical imaging processing/analysis task can include (but is not limited to): organ segmentation, anomaly detection, anatomical feature characterization, medical image reconstruction, diagnosis, and the like. The types of medical images processed/analyzed by the medical image processing model can include images captured using various types of imaging modalities. For example, the medical images can include (but are not limited to): radiation therapy (RT) images, X-ray images, CXR images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can include two-dimensional (2D) images as well as three-dimensional images (3D).

The terms "source domain model", "source model" "source image processing model", "source domain image processing model" and the like are used herein interchangeably to refer to an imaging processing model trained on images from specific domain, referred to herein as the source domain. Images included in the source domain are referred to herein as "source domain images" or "source images." As applied to image harmonization, the reference image or images are or correspond to source domain images. In this regard, images that vary in appearance from the source domain images are considered herein as images from a different but similar domain relative to the source domain. These images can comprise images of the same "type" as the source domain images, yet that have some appearance variations relative to the source domain images. For example, the appearance variations can be attributed to one different imaging factors, including but not limited to: image capture protocol, image capture modality, capture voltage, sequence intensities, dose usage, exposure setting, photon receiving materials, FOV, demography, contrast vs. non-contrast, and other factors affecting image quality (IQ) or appearance. For example, the source domain images and the variational images can comprise a same type of medical image yet captured from different acquisition sources used at different medical centers. In another example, the source domain images and the variational images can comprise medical images of a same anatomical body part (e.g., a same organ), yet differ with respect to capture modality (CT images with and without contrast). In another example, the source domain images and the variational images can vary with respect to different capture voltages. In another example, the source domain images and the variational images can include MR images that vary with respect to sequence intensities.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates image harmonization for deep learning model optimization in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 comprises a computing device 104 that can include various computer/machine executable components, including decomposition component 106, image harmonization component 108 and reconstruction component 110. The computing device 104 can further include or be operatively coupled to at least one memory 118 and at least one processor 116. In various embodiments, the at least one memory 118 can store executable instructions (e.g., the decomposition component 106, the image harmonization component 108, the reconstruction component 110, and additional components described herein) that when executed by the at least one processor 116, facilitate performance of operations defined by the executable instructions. The computing device 104 further includes a reference image data source 114 that can store one or more reference images. In other implementations, the one or more reference images can be stored in memory 118 or another suitable data structure accessible to the computing device 104. The computing device 104 can further include a device bus 112 that communicatively couples the various components of the computing device 104. Examples of said processor 116 and memory 118, as well as other suitable computer or computing-based elements, can be found with reference to FIG. 17 with respect to processing unit 1716 and system memory 1714, and can be used in connection with implementing one or more of the systems or components shown and described in connection with FIG. 1 or other figures disclosed herein.

In some embodiments, system 100 can be deployed using any type of component, machine, device, facility, apparatus, and/or instrument that comprises a processor and/or can be capable of effective and/or operative communication with a wired and/or wireless network. All such embodiments are envisioned. For example, the computing device 104 can be or correspond to a server device, a general-purpose computer, a special-purpose computer, a tablet computing device, a handheld device, a server class computing machine and/or database, a laptop computer, a notebook computer, a desktop computer, a cellular phone, a smart phone, a consumer appliance and/or instrumentation, an industrial and/or commercial device, a digital assistant, a multimedia Internet enabled phone, a multimedia player, and/or another type of device.

It should be appreciated that the embodiments of the subject disclosure depicted in various figures disclosed herein are for illustration only, and as such, the architecture of such embodiments are not limited to the systems, devices, and/or components depicted therein. In some embodiments, one or more of the components of system 100 and other systems described herein can be executed by different computing devices (e.g., including virtual machines) separately or in parallel in accordance with a distributed computing system architecture. System 100 can also comprise various additional computer and/or computing-based elements described herein with reference to operating environment 1700 and FIG. 17. In several embodiments, such computer and/or computing-based elements can be used in connection with implementing one or more of the systems, devices, components, and/or computer-implemented operations shown and described in connection with FIG. 1 or other figures disclosed herein.

The decomposition component 106, image harmonization component 108 and reconstruction component 110 can collectively perform an image harmonization process that can be used to transform an input image 102 into a harmonized image 118. The harmonized image 118 generated in accordance with this image harmonization process is a modified version of the input image 102 that has a more similar appearance to one or more reference images (e.g., included in the reference image data source 114) relative to the input image 102. In various embodiments, the one or more reference images can be or correspond to training images from a particular source domain that were used to train a particular AI/ML image processing model. Thus, the image harmonization process provided by the decomposition component 106, the image harmonization component 108, and the reconstruction component 110 can be used to transform an input image 102 that has or may have some appearance variations relative to the training images into a harmonized image 118 that corrects or normalizes those appearance variations such that the harmonized image 118 appears more similar to the training images. Accordingly, the image harmonization process provided by the decomposition component 106, the image harmonization component 108, and the reconstruction component 110 can be used as a pre-processing step to transform images with appearance variations relative to an image processing model's training images into harmonized images prior to input into the image processing model. As a result, the image processing model can be applied to images from various domains other than the source domain with no or minimal performance degradation.

In accordance with one or more embodiments, the image harmonization process involves decomposing the input image 102 into sub-images by the decomposition component 106, harmonizing the sub-images with corresponding reference sub-images decomposed from the one or more reference images to generate modified sub-images by the harmonization component 108, and recombining the modified sub-images by the reconstruction component 110 to generate the harmonized image 118. In some embodiments a single reference image can be used for harmonization. For example, the single reference image can serve as a single representative image that represents the training image dataset. In some implementations, the single reference image can be pre-selected. In other implementations, the single reference image can be selected from amongst candidate reference images based on its degree of similarity to the input image. In other embodiments, multiple reference images (e.g., two or more) can be used for harmonization. Additional features and functionalities regarding reference image selection and usage of multiple reference images are described infra with reference to FIG. 8. For ease of explanation, the features and functionalities of the system 100 are initially described with reference to FIGS. 1-7 in accordance with embodiments that use a single reference image.

In this regard, the decomposition component 106 can decompose the input image 102 into two or more sub-images using one or more decomposition processes. In some embodiments, the reference image as provided in the reference image data source 114 can be pre-decomposed into the corresponding reference sub-images generated using the same decomposition processed used to decompose the input image 102. In other implementations, the decomposition component 106 can decompose both the input image 102 the reference image (or images) at runtime.

In various embodiments, the decomposition component 106 can decompose the input image 102 using a novel energy band decomposition process that comprises decomposing the input image 102 into different energy band images (also referred to as sub-band images). With these embodiments, the same energy band decomposition process is applied to the reference image to decompose the reference image into corresponding reference energy band images. As used herein, the term "energy band image" (or sub-band image) is used to refer to a frequency domain filtered version of an image that contains a subset of the spectral components of the original image. In this regard, each energy band image generated from the original image has a different frequency band or frequency range and different energy frequency values or intensity values within its frequency band/range.

Figure 2:
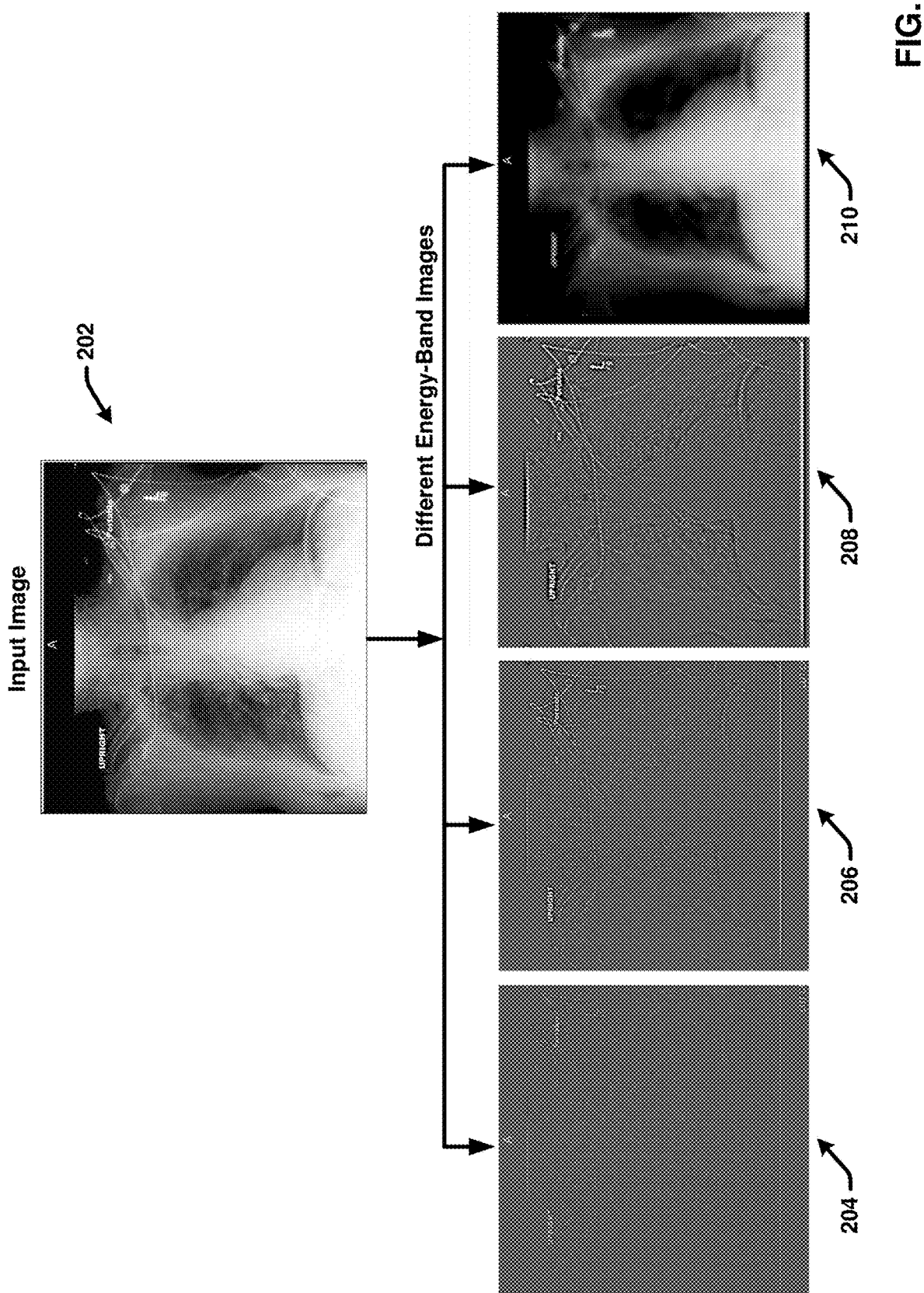
FIG. 2 illustrates decomposition of an image into different energy band images in accordance with one or more embodiments of the disclosed subject matter.

For example, FIG. 2 illustrates decomposition of an input image 202 into different energy band images in accordance with one or more embodiments of the disclosed subject matter. In various embodiments, the input image 202 can be or correspond to input image 102. In this example, the input image 202 comprises a CXR image, however, it should be appreciated that the input image can comprise other types of medical and non-medical images. In the embodiment shown, the input image 202 has been decomposed into four different energy band images, respectively identified as energy band image 204, energy band image 206, energy band image 208, and energy band image 210. Each of the different energy band images are filtered version of the input image 202 with different frequency intensities removed.

With reference to FIG. 1 in view of FIG. 2, in various embodiments, the decomposition component 106 can decompose an input image (e.g., input image 102, input image 202, and the like), into different energy band images (e.g., energy band image 204, energy band image 206, energy band image 208, and energy band image 210) using a decomposition process that involves generating new energy band images that are high pass bands) bands from a low pass signal band. In this regard, the decomposition component 106 can decompose the original image into different energy band images with different frequency bands, wherein each energy band image is filtered from a previously generated low pass signal (e.g., from a low pass band to a higher pass band). The last low pass signal band can further be included as the last band to cover all frequency bands. In this regard, as expressed mathematically, the decomposition component 106 can decompose the original input image I(x) into different energy band images $I_i$ with different energy band frequencies in accordance with Equations 1-3 below. The number (i) of different energy band images can vary, wherein i=1, 2 . . . , B such that the last energy band image is denoted as B.

$L_i(x)=L_{i-1}(x)*G(x; \sigma_i)$, wherein G is a Gaussian kernel and $\sigma_i$ can be a randomly selected increasing number     Equation 1.

$I_i(x)=L_{i-1}(x)-L_i(x)$ for i=1, . . . , B−1, wherein $L_0(x)$ =I(x)     Equation 2.

$I_B(x)=L_{B-1}(x)$ for i=B     Equation 3.

In accordance with Equations 1-3, the decomposition component 106 can first perform a Gaussian calculation (convolution) on the original input image I(x) to get image $L_i(x)$ which is a smoother version of the original input image in accordance with Equation 1. In this regard, $L_i(x)$ is the smoothed image based on the previous image and a defined Gaussian kernel. For the first time computation (i.e., the first pass), the previous smoothed image is just the input image.

Next, in accordance with Equation 2, the decomposition component 106 can perform a subtraction between the $L_{i-1}(x)$ and the smooth image from the previous step $L_i(x)$ to get an energy band image $I_i$. The resulting energy band image belongs to a high frequency. As noted, wherein $L_0(x)=I(x)$, from this first past wherein i=1, this first subtraction will be a subtraction of the first smooth image $L_i(x)$ from the original input $I(x)$, to get the first energy band image $I_1$. As reflected by Equation 3, the decomposition component 106 can perform the operations of Equations 1 and 2 multiple times, wherein each time, a lower frequency smooth version of the input image generated using Equation 1 is used for the subtraction to generate the next energy band-image. In this regard, each new energy band image is generated from a low pass energy band image, wherein the new energy band image generated has a higher frequency band relative to the low pass energy band from which it was generated (i.e., from which it was subtracted).

For example, with reference to FIG. 2, the four different energy band images correspond to the resulting images generated through each pass of Equations 1-3, wherein four passes were performed. In this regard, energy band image 204 can be or correspond to a first pass sub-band image ($I_1$) that comprises first sub-band energy frequencies of the input image 202, energy band image 206 can be or correspond to a second pass sub-band image ($I_2$) that comprises second sub-band energy frequencies of the input image 202, energy band image 208 can be or correspond to a third pass sub-band image ($I_3$) that comprises third sub-band energy frequencies of the input image 202, and energy band image 210 can be or correspond to a fourth pass sub-band image ($I_4$) that comprises fourth sub-band energy frequencies of the input image. Each subsequent energy band image generated through each pass has a higher frequency band range relative to the previous image, except for the last one (i.e., energy band image 210), which belongs to the lowest frequency band from which the previous images were generated.

The reference image can also be decomposed into different energy band images using the same decomposition process described above. In this regard, the reference image can be decomposed into energy band images with the same frequency bands/ranges as the input image. As a result, each of the different reference energy band images can be paired with a corresponding energy band image of the input image. As noted above, in some implementations, the decomposition component 106 can decompose the reference image to generate the reference energy band images in the same manner as the described for the input image (e.g., using Equations 1-3).

In various embodiments, after the input image (e.g., input image 102, input image 202 and the like) and the reference image have been respectively decomposed into energy band images, the harmonization component 108 can harmonize each energy band image for the input image 102 with the corresponding reference energy band image by making one or more statistics of the energy band image the same or similar those of the corresponding reference energy band image. For example, various statistical measures can be calculated or generated for each energy band image based on its energy band frequencies/intensities, including but not limited to: the mean of its energy band image intensity values, the standard deviation of its energy band image intensity values, the percentiles of its energy band image intensity values, and a histogram of its energy band image intensity values. In this regard, the harmonization component 108 can harmonize each energy band image of the input image 102 with a corresponding reference energy band image by modifying (e.g., with respect to a defined degree of change) the energy band frequencies/intensities of the energy band image such that one or more of the statistical measures of the energy band frequencies/intensities are the same or more similar to those of the corresponding reference energy band image. As a result, the image harmonization component 108 can transform each energy band image of the input image 102 into a modified energy band image that is more similar to a corresponding reference energy band image.

Figure 3:
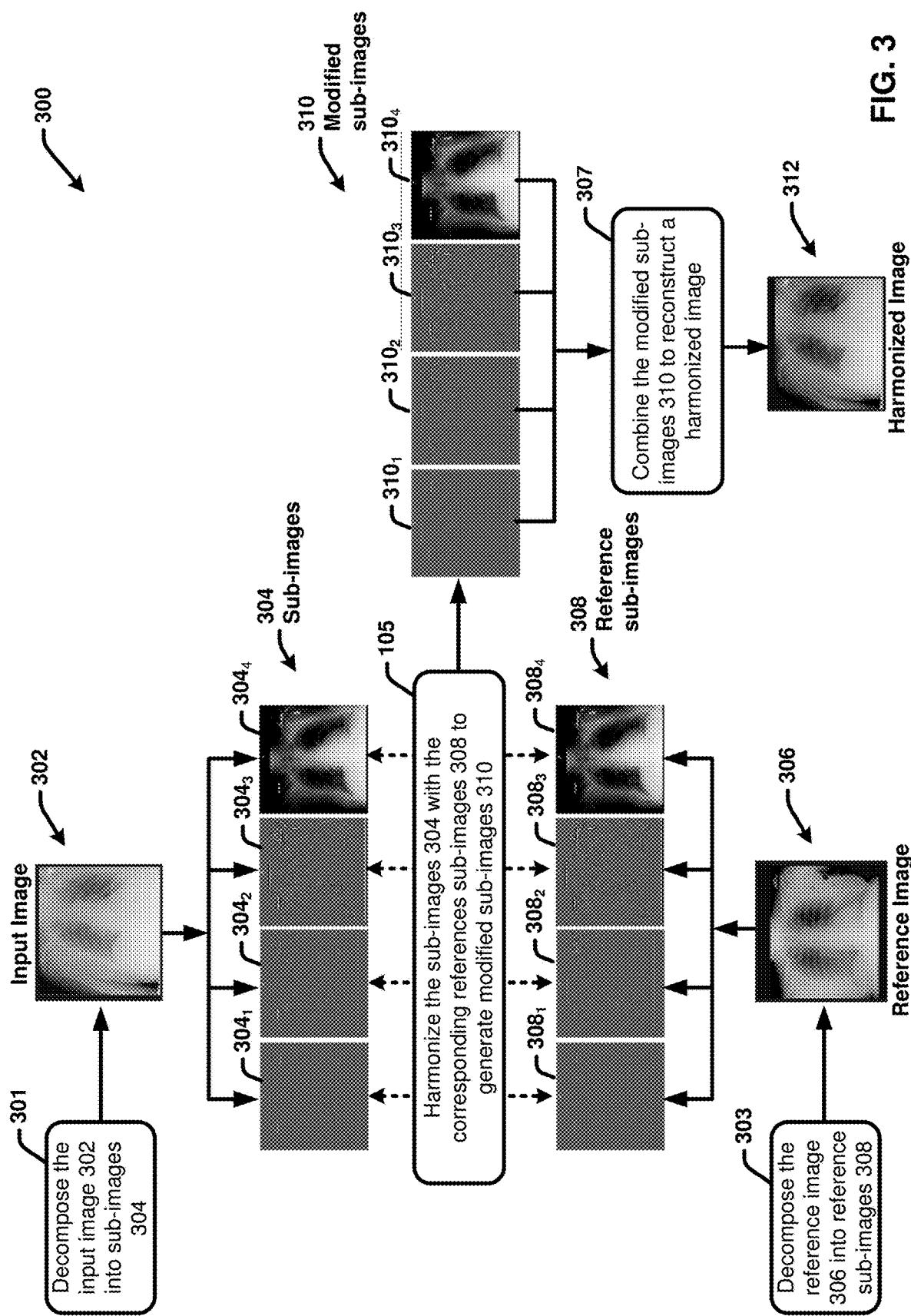
FIG. 3 presents a flow diagram of an example image harmonization process in accordance with one or more embodiments of the disclosed subject matter.

For example, FIG. 3 presents a flow diagram of an example image harmonization process 300 in accordance with one or more embodiments of the disclosed subject matter. The image harmonization process 300 illustrated in FIG. 3 provides an example embodiment of the disclosed image harmonization techniques as applied to CXR images and harmonization with energy bands. However, the image harmonization process 300 can be applied to various other types of images using other decomposition techniques to generate the sub-images.

With reference to FIG. 3 in view of FIG. 1, in accordance with image harmonization process 300, at 301 the decomposition component 106 can decompose an input image 302 into sub-images 304. In one or more example implementations, the input image 302 can be or correspond to a CXR image to be harmonized with the training image dataset used to train a particular image processing model. In this regard, the input image 302 can comprise a CXR image from a different domain relative to the training image dataset. For example, the input image 302 may have been captured using a different X-ray system/protocol relative to the training images. Regardless of the reason, the input image 302 can have at least some appearance variations relative to the training images.

In the embodiment shown, the different sub-images are respectively identified as sub-image $304_1$, sub-image $304_2$, sub-image $304_3$ and sub-image $304_4$. For example, as applied to energy band image decomposition, each sub-image can be a different energy band image generated from each pass through Equations 1-3. In this regard, sub-image $304_1$ can correspond to a first energy band image with a first frequency range, sub-image $304_2$ can correspond to a second energy band image with a second frequency range, sub-image $304_3$ can correspond to a third energy band image with a third frequency range, and sub-image $304_4$ can correspond to a fourth energy band image with a fourth energy frequency range.

Similarly, at 303, the decomposition component 106 can decompose a reference image 306 into reference sub-images 308 using the same decomposition process used for the input image 302. In the embodiment shown, the different reference sub-images are respectively identified as reference sub-image $308_1$, reference sub-image $308_2$, reference sub-image $308_3$ and reference sub-image $308_4$. For example, as applied to energy band image decomposition, each of the reference sub-images 308 can also be a different energy band image generated from each pass through Equations 1-3. In this regard, reference sub-image $308_1$ can correspond to a first reference energy band image with the first frequency range, reference sub-image $308_2$ can correspond to a second reference energy band image with the second frequency range, reference sub-image $308_3$ can correspond to a third reference energy band image with the third frequency range, and reference sub-image $308_4$ can correspond to a fourth reference energy band image with the fourth frequency range.

At 105, the image harmonization component 108 can harmonize the sub-images 304 with the corresponding reference sub-images 308 to generate modified sub-images 310. In this regard, the image harmonization component 108 can harmonize sub-image $304_1$ with reference sub-image $308_1$ to generate modified sub-image $310_1$, harmonize sub-image $304_2$ with reference sub-image $308_2$ to generate modified sub-image $310_2$, harmonize sub-image $304_3$ with reference sub-image $308_3$ to generate modified sub-image $310_3$, and harmonize sub-image $304_2$ with reference sub-image $308_2$ to generate modified sub-image $310_2$.

In various embodiments in which the sub-images are energy band images, the image harmonization component 108 can calculate, generate or otherwise determine statistical measurements for each of the sub-images and each of the reference sub-images based on their respective energy frequencies/intensities included within their frequency range/band). For example, statistical measurements for each of the sub-images 304 and the reference sub-images 308 can include but are not limited to: the mean of its energy band image intensity values, the standard deviation of its energy band image intensity values, the percentiles of its energy band image intensity values, and a histogram of its energy band image intensity values. The image harmonization component 108 can further harmonize each sub-image with its corresponding reference sub-image (e.g., with the same frequency range/band) by modifying the intensities/frequencies of the sub-image to such that its statistical measures are the same or similar to that of the corresponding reference sub-image. For example, the harmonization component 108 can adjust the intensities/frequencies of sub-image $304_1$ such that one or more of: 1.) the mean of its intensities/frequencies is the same or closer (with respect to a defined degree of change) to mean of the intensities/frequencies of reference sub-image $308_1$; 2.) the standard deviation of its intensities/frequencies is the same or closer (with respect to a defined degree of change) to the standard deviation of the intensities/frequencies of reference sub-image $308_1$, 3.) the percentiles of its intensities/frequencies are the same or closer (with respect to a defined degree of change) to the percentiles of the intensities/frequencies of reference sub-image $308_1$, and 4.) the histogram of its intensities/frequencies is the same or closer (with respect to a defined degree of change) to the histogram of the intensities/frequencies of reference sub-image $308_1$. The image harmonization component 106 can similarly apply this same harmonization process to harmonize sub-image $304_2$ with reference sub-image $308_2$, sub-image $304_3$ with reference sub-image $308_3$, and sub-image $304_4$ with reference sub-image $308_4$. It should be appreciated that the disclosed harmonization techniques are not limited to these statistical measures and that other statistical measures can be used.

In various embodiments, two or more statistical measures can be used in combination to increase the output of the image harmonization. For example, in some embodiments, the image harmonization component 106 can employ both the mean and the standard deviation of the energy band image intensities/frequencies. In some implementation of these embodiments, the harmonization component 106 can harmonize each energy band image with its corresponding reference energy band image in accordance with Equation 4 below, wherein $I_{harm\_i}(x)$ represents a harmonized (or modified) sub-image (e.g., one of the modified sub-images 310), $I_{input\_i}(x)$ represents a sub-image for the input image 302 (e.g., one of the sub-images 304), $I_{ref\_i}(x)$ represents a reference sub-image (e.g., one of the reference sub-images 308), and "std" is the abbreviation for standard deviation.

$$I_{harm\_i}(x) = \text{mean } (I_{ref\_i}(x)) + \frac{(I_{input\_i}(x) - \text{mean } (I_{input\_i}(x)) * std(I_{ref\_i}(x))}{std(I_{input\_i}(x))}$$

Equation 4.

With reference again to process 300 in view of FIG. 1, once the modified sub-images 310 have been generated at 307, the reconstruction component 110 can combine the modified sub-images to reconstruct a harmonized image 312. The resulting harmonized image 312 has a greater degree of similarity to the reference image in terms of appearance relative to the input image 302. For example, in the embodiment shown, the harmonized image 312 looks more like the reference image 306 than the input image 302 in terms of intensities.

Figure 4:
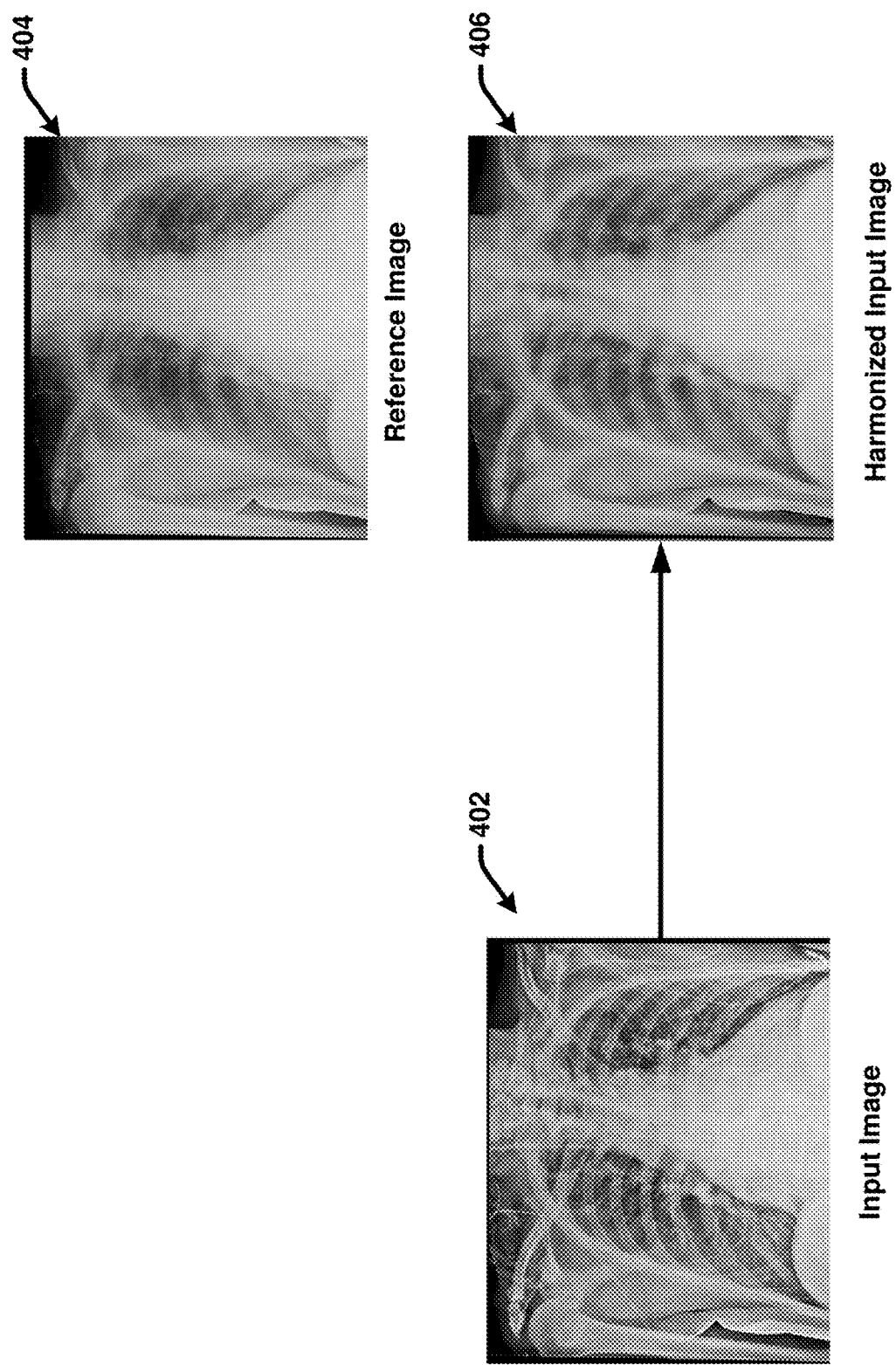
FIG. 4 presents chest X-ray images before and after image harmonization in accordance with one or more embodiments of the disclosed subject matter.

FIG. 4 presents an example CXR image before and after image harmonization in accordance with one or more embodiments of the disclosed subject matter. In particular, the harmonized input image 406 was generated from input image 402 using reference image 404 and the energy band decomposition/harmonization processes of Equations 1-4. As can be seen in FIG. 4, the harmonized input image 406 is more similar in appearance to the reference image 404 relative to the input image 402.

Experiments were conducted to evaluate the effectiveness of the image harmonization processes as applied to CXR image processing models configured to perform pneumoperitoneum diagnosis, segmentation, and endotracheal tube position estimation on CXR images (such as those shown in FIG. 4) from a specific source domain. In accordance with these experiments, model performance was evaluated when applied to CRX images from various other domains without harmonization (e.g. input image 402) and the same CRX images after harmonization (e.g., harmonized image 404) in accordance with the energy band decomposition/harmonization processes of Equations 1-4). The results from the different datasets consistently showed that this image harmonization process increases the effectiveness of deep learning pipelines in terms of accuracy, area under the receiver operating characteristic curve, DICE coefficient and other error measures related to the applications.

Figure 5:
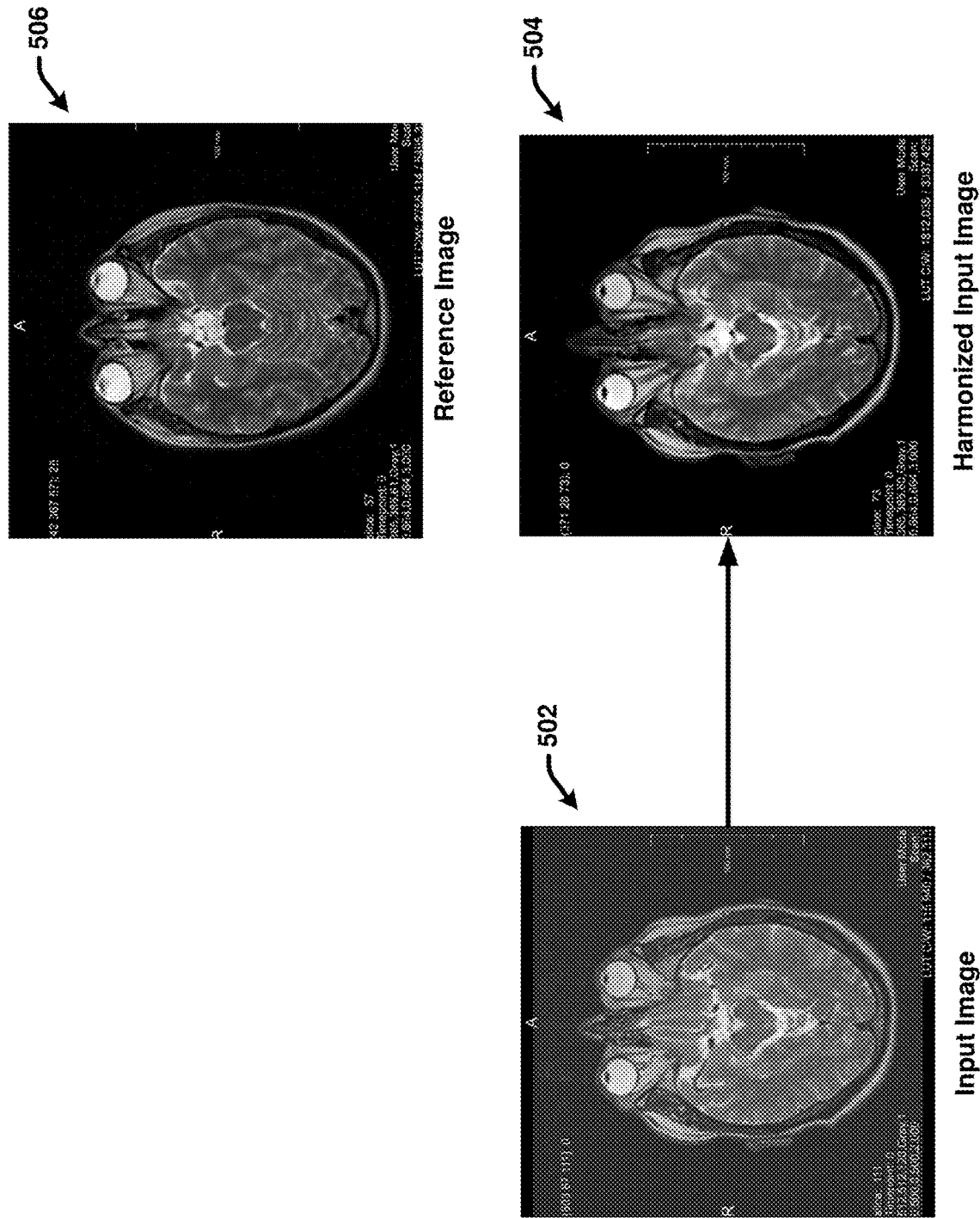
FIG. 5 presents magnetic resonance (MR) scan images before and after image harmonization in accordance with one or more embodiments of the disclosed subject matter.

FIG. 5 presents an example MR scan image before and after image harmonization in accordance with one or more embodiments of the disclosed subject matter. In particular, the harmonized input image 504 was generated from input image 502 using reference image 506 and the energy band decomposition/harmonization processes of Equations 1-4. As can be seen in FIG. 5, the harmonized input image 504 is more similar in appearance to the reference image 506 relative to the input image 502.

Experiments were conducted to evaluate the effectiveness of the image harmonization processes as applied to MR image processing models configured to perform organ and lesion segmentation on MR images (such as those shown in FIG. 5) from a specific source domain. In accordance with these experiments, model performance was evaluated when applied to MR images from various other domains without harmonization (e.g. input image 502) and the same MR images after harmonization (e.g., harmonized image 504) in accordance with the energy band decomposition/harmonization processes of Equations 1-4). The results from the different datasets again consistently showed that this image harmonization process increases the effectiveness of the image processing models. For example, in a testing dataset of 73 organs with full coverage, the success rate of an organ segmentation model went from 86.3% to 89% after harmonization. In addition, an MR brain lesion detection/segmentation model was tested on a dataset of 35 patients with multi-MR sequences (T1, T1 ce, T2 and Flair). The model performance increased from a DICE score of 0.655+/−0.232 before harmonization to 0.709+/−0.19 after harmonization.

Figure 6:
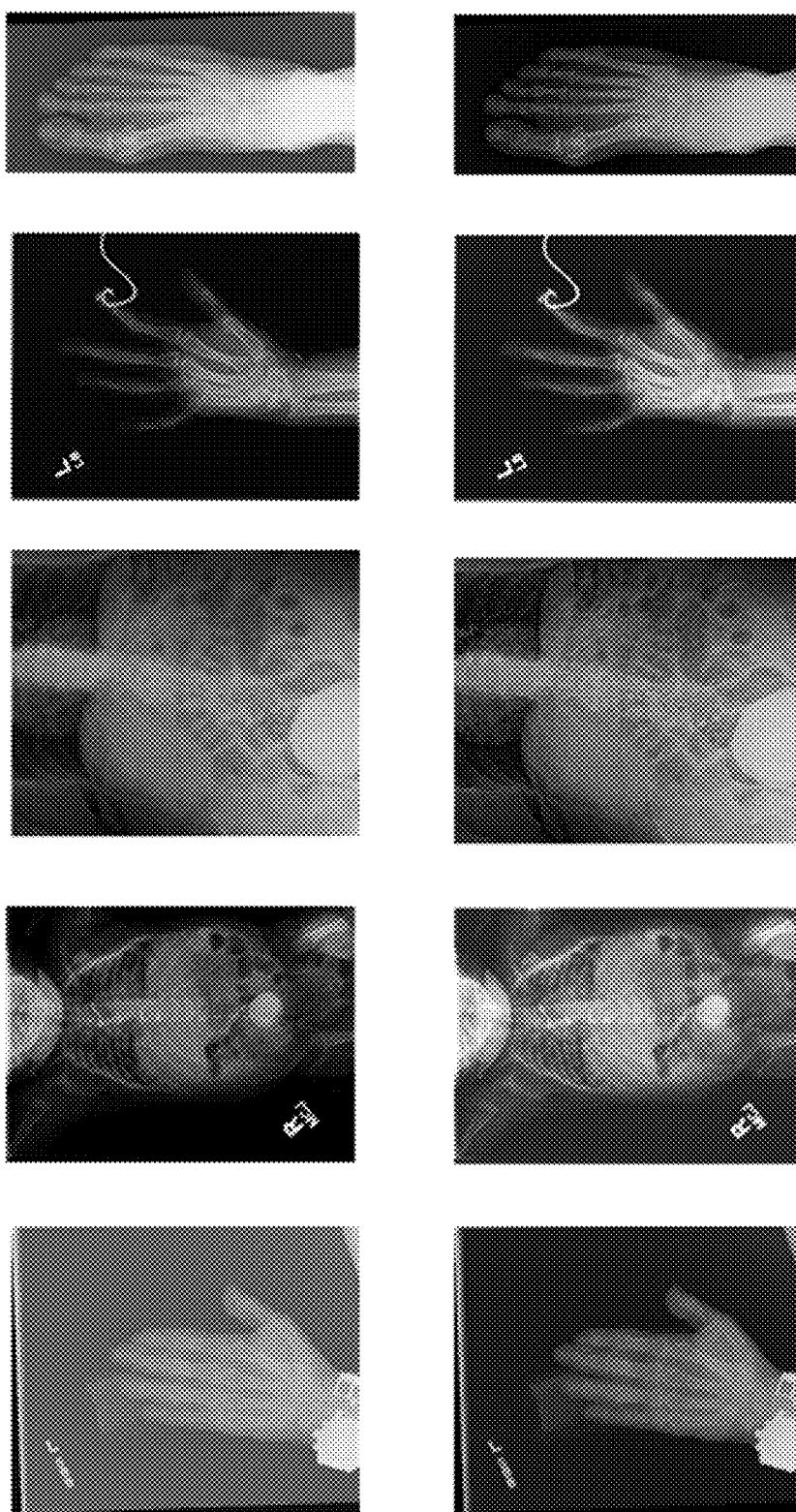
FIG. 6 presents X-ray images of different anatomical parts before and after image harmonization in accordance with one or more embodiments of the disclosed subject matter.

FIG. 6 presents X-ray images of different anatomical parts before and after image harmonization in accordance with one or more embodiments of the disclosed subject matter. The disclosed image harmonization techniques can be applied to correct various appearance variations in images as well as to correct errors and remove artifacts. For example, FIG. 6 shows the results of the disclosed energy band image harmonization techniques as applied to X-ray images to correct window level and widow width from different X-rays images.

With reference again to FIG. 1, in some embodiments, the decomposition component 106 can employ other decomposition techniques to decompose the input image 102 (and the reference image) into sub-images. For example, in one implementation, the decomposition component 106 can decompose the input image 102 and the reference image by segmenting them into two or more different regions. For instance, as applied to medical images, a medical image can be segmented into different regions (e.g. organs) of interest using a pre-trained segmentation model. In this regard, each segmented region can be considered a sub-image and will have different features (e.g., with respect to appearance features and/or spatial features).

With these embodiments, the harmonization component 108 can harmonize each sub-image with its corresponding reference sub-image by making one or more features of the sub-image the same or more similar (e.g., with respect to a defined degree of change) to the corresponding features of the corresponding reference sub-image. For example, the harmonization component 108 can modify one or more visual features of the sub-image to be more similar to the corresponding visual features of the reference sub-image (e.g., pixel coloration, pixel tone, saturation, etc.). In another example, the harmonization component 108 can modify one or more spatial features of the sub-image to be more similar to the corresponding visual features of the reference sub-image (e.g., pixel location, sub-image thickness, sub-image size/shape, etc.). In some implementations, the harmonization component 108 can also calculate or otherwise generate statistical measures for a sub-image based on its spatial and/or visual features and modify the sub-image such that its statistical measures are the same or similar to those of the corresponding sub-image. For example, as applied to segmented sub-images, the harmonization component 108 can harmonize the respective segmented regions for the input image 102 with corresponding segmented regions the reference image by making one or more visual and/or spatial features of the original image segments more similar to the corresponding visual and/or spatial features of the corresponding reference image segments. The reconstruction component 110 can then recombine the modified sub-images to generate the harmonized image 118.

Figure 7:
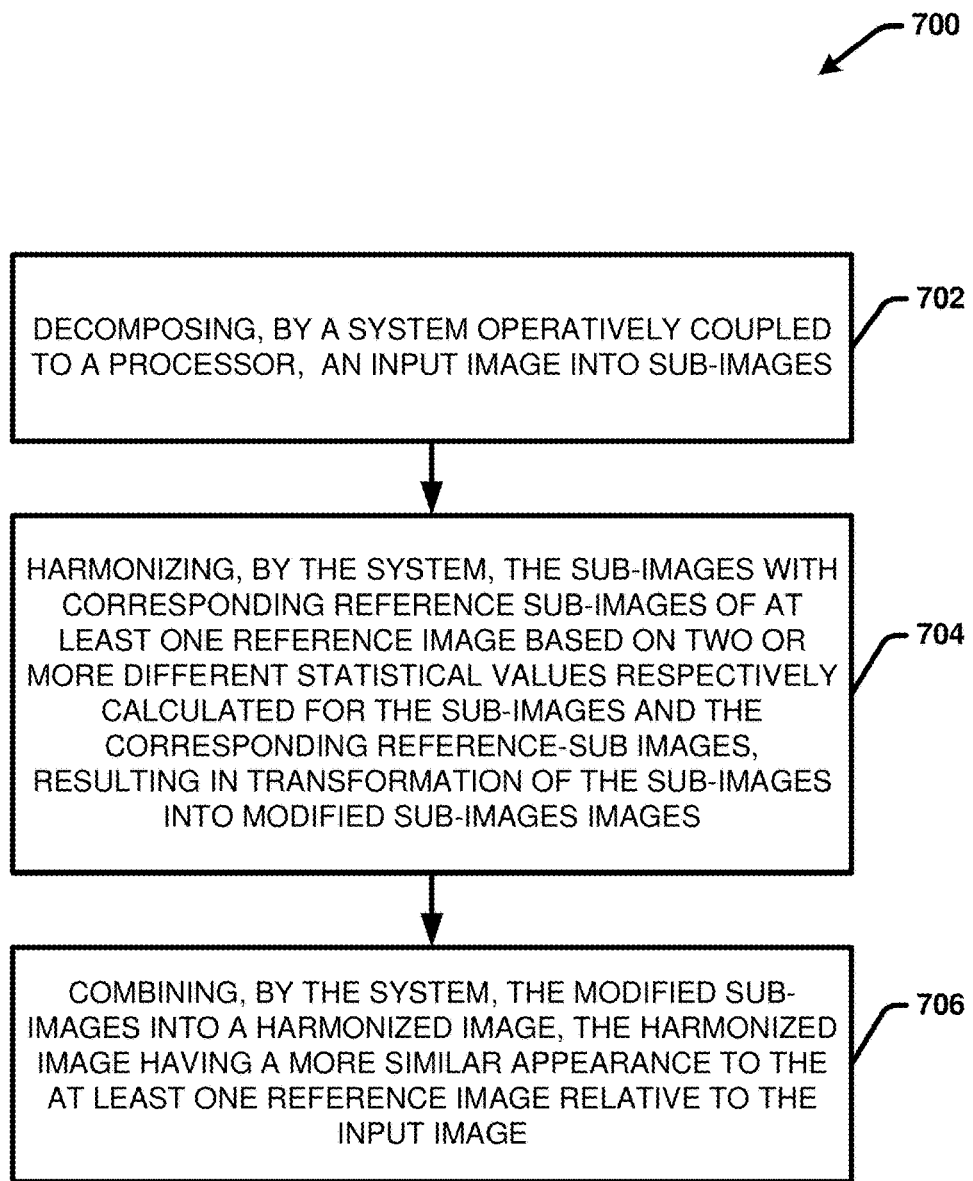
FIG. 7 illustrates an example, high-level flow diagram of a computer-implemented process for image harmonization in accordance with one or more embodiments of the disclosed subject matter.

FIG. 7 illustrates an example, high-level flow diagram of a computer-implemented process 700 for image harmonization in accordance with one or more embodiments of the disclosed subject matter. Repetitive description of like elements employed in respective embodiments is omitted for sake of brevity.

At 702, method 700 comprises decomposing, by a system operatively coupled to a processor (e.g., system 100), an input image (e.g., input image 302) into sub-images (e.g., sub-images 304 using decomposition component 106). In various embodiments, the sub-images can comprise energy band images with different energy frequencies generated in accordance with equations 1-3. In other implementations, the sub-images can comprise different segmented regions of the input images. Various other decomposition mechanism and resulting sub-image can also be used. At 704, method 700 comprises harmonizing (e.g., using image harmonization component 108) the sub-images with corresponding reference sub-images (e.g., reference sub-images 308) of at least one reference image (e.g., reference image 306) based on two or more different statistical values respectively calculated for the sub-images and the corresponding reference-sub images, resulting in transformation of the sub-images into modified sub-images images (e.g., modified sub-images 310). For example, in implementations in which the sub-images are energy band images, the harmonization component 106 can modify the intensities of each sub-image such that one or more statistical measures of the intensities (e.g., the mean of the intensities, the standard deviation of the intensities, percentiles of the intensities, the histogram of the intensities, etc.) are the same or more similar to (e.g., with respect to a defined degree of change), to the corresponding statistical measures of the corresponding reference energy band image. At 706, method 700 comprises combining (e.g., using the reconstruction component 110) the modified sub-images into a harmonized image (e.g., harmonized image 312), the harmonized image having a more similar appearance to the at least one reference image relative to the input image.

Figure 8:
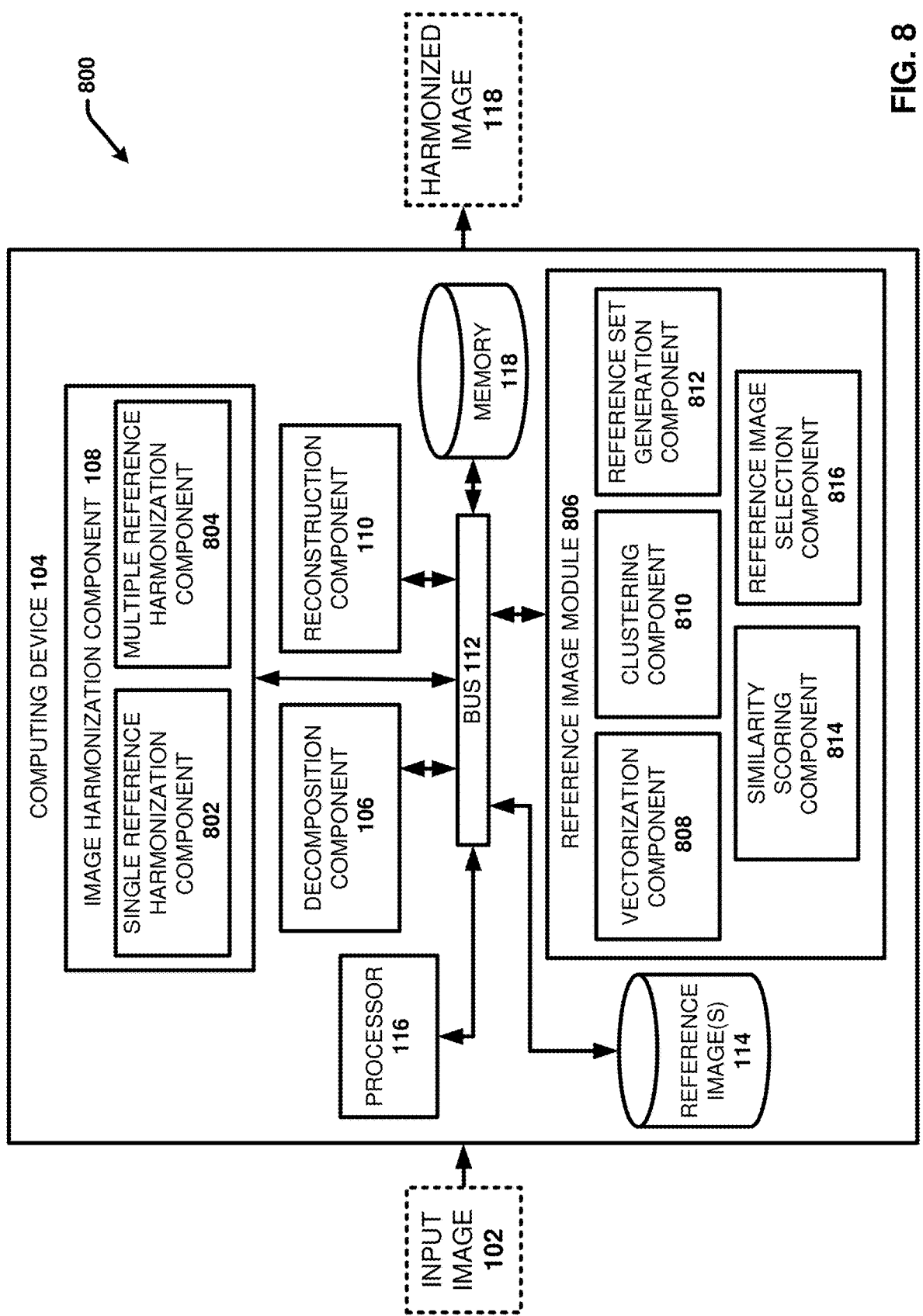
FIG. 8 illustrates a block diagram of another example, non-limiting system that facilitates image harmonization for deep learning model optimization in accordance with one or more embodiments of the disclosed subject matter.

FIG. 8 illustrates a block diagram of another example, non-limiting system 800 that facilitates pre-processing image harmonization for deep learning model optimization in accordance with one or more embodiments of the disclosed subject matter. System 800 includes same or similar components as system 100 with the addition of reference image module 806 and the division of image harmonization component 108 into a single image harmonization component 802 and a multiple reference harmonization component 804. Repetitive description of like elements employed in respective embodiments is omitted for sake of brevity.

As noted above, in some embodiments, a same, single, pre-selected reference image can be used to transform all input images (e.g., input image 102) into harmonized images for input into a particular image processing model. In other embodiments, multiple (e.g., two or more) reference images can be used, or a specific reference image can be selected from amongst candidate reference images for harmonizing with a specific input image based on the specific reference image having the greatest degree of similarity to the specific input image. In implementations in which multiple references are used, the sub-images decomposed from the input image 102 can be harmonized with corresponding reference sub-images of the multiple reference images using a weighting scheme for the reference sub-images determined based on degrees of similarity between the input image and the respective reference images. The reference image module 806 provides various components to facilitate this end, including vectorization component 808, clustering component 810, reference set generation component 812, similarity scoring component 814 and reference image selection component 816.

In some embodiments, the vectorization component 808 can generate feature vectors for the input image 102 and candidate reference images included in the reference image data source 114. The feature vectors can be used to determine a degree of similarity between the input image 102 and the respective candidate reference images. In some implementations, the feature vectors can be generated based on one or more of the statistical measures that will be used to harmonize the sub-images with the corresponding reference sub-images. For example, in implementations in which the images are decomposed into energy band images, the vectorization component 808 can generate the feature vectors based on one or more statistics of their respective energy band images (e.g., the means of the energy band image intensity values for each energy-band image, the standard deviations of the energy band image intensity values for each energy-band image, the percentiles of the energy band image intensity values for each energy-band image, etc.). In some embodiments, the vectorization component 808 can also employ other image-based features (e.g., dose usage, exposure setting, photon receiving materials, FOV, demography, contrast vs. non-contrast, etc.) and/or non-image based features (e.g., patient specific features such as patient demographics, patient medical history, etc.) included in metadata associated with the respective images to generate the feature vectors.

Additionally, or alternatively, the vectorization component 808 can generate the feature vectors based on the outputs of one or more fully connected layers of one or more pretrained deep neural network models trained on a corpus of similar images (e.g., using an ImageNet dataset or the like). For example, the pretrained deep neural network can include a classic neural network model, a convolutional neural network model, a recurrent neural network model, an autoencoder network, or the like. The task of the pretrained model can vary, so long as it is configured to consistently identify and extract (as the output of one or more fully connected layers) relevant and distinguishing features from the input images. For example, in one implementation, the pretrained model can comprise a deep autoencoder model than consists of an encoder neural network and a decoder neural network. Such autoencoder models generally work by mapping input data into a latent representation in feature space which is then decoded by the decoder network to reconstruct the input data from the reduced feature representation in the latent space. As applied to the disclosed subject matter, the autoencoder model can be trained on corpus of images similar to the input image (e.g., the same type, such as CXR images) yet from various domains or that otherwise have appearance variations. The trained encoder network of the autoencoder can be applied to the input image and the reference images to extract reduced feature sets for the respective images which can be used to generate feature vectors for the respective images.

As noted above, the reference image or images used for harmonization can be or correspond to the training images used to train a particular image processing model. In some embodiments, the vectorization component 808 can generate feature vectors for each of the training images or a randomly selected reduced subset of the training images. These training images can thus be considered candidate reference images in this context. In some embodiments, the similarity scoring component 814 can compare the feature vector for the input image 102 to the feature vectors for all (or the reduced subset) of the candidate reference images and determine a degree of similarity between the input image feature vector and the feature vectors of the respective candidate reference images. For example, the similarity scoring component 814 can generate a similarity score for each input image/candidate reference image pair based on a degree of similarity between their feature vectors.

In some implementations of these embodiments, the reference image selection component 816 can select a single candidate reference image to be used for harmonization with the input image 102 based on the similarity score for the input image/candidate reference image pair being the highest (i.e., the most similar or best match). With these implementations, the image harmonization component 108 can employ the single reference harmonization component 802 to harmonize the reference image with the input image using the technique described above.

In another implementation, the reference set generation component 816 can select the top N highest (wherein N is a defined integer greater than one) scoring candidate reference images for inclusion in a reference image set be used for harmonization with the input image 102 in accordance with the multiple reference harmonization scheme. In another implementation in which multiple reference images are used, to provide a more diverse representation of the training dataset population, the reference set generation component 812 can select a subset of the candidate reference images that have varying degrees of similarity with the input image (e.g., that have varying similarity scores) for inclusion in the reference image set. For example, the reference set generation component 812 can select the top scoring candidate reference image (e.g., having the closest degree of similarity to the input image), the lowest scoring candidate reference image, and a middle scoring candidate reference image.

Additionally, or alternatively, rather than comparing the input image feature vector with the feature vectors for all of the training images (i.e., the candidate reference images), the reference set generation component 812 can generate a fixed reference image set of reference images that provide a diverse representation of images included in the training dataset. This fixed set of reference images can then be applied to for each input image 102. According to these embodiments, the clustering component 810 can cluster the candidate reference images into different groups of related images based on similarities and differences between their feature vectors (e.g., using a suitable clustering algorithm such as k-means clustering or the like). The number of clusters can vary based on the desired number of reference images for inclusion in the reference image set. The reference set generation component 812 can further select one or more representative reference images from each cluster for inclusion in the fixed reference image set. In this regard, the reference set generation component 812 can pick a few representative reference images with vectors that span the training dataset population as much as possible.

In some implementations of these embodiments, after the fixed reference image set is generated, each time a new input image is received for harmonization, the vectorization component 808 can generate a feature vector for the input image. The similarity scoring component 814 can further generate similarity scores for each input image/reference image included in the set based on their respective feature vectors. The reference image selection component 816 can further select one of the reference images included in the set for harmonization with the input image using the single reference harmonization component 802.

In various alternative embodiments in which multiple images are selected (e.g., the images included in a reference image set), the multiple reference harmonization component 804 can harmonize the input image 102 using each of the reference images in the set and a weighting scheme based on the degree of similarity of the input image feature vector with each of the feature vectors of the reference images included in the set. For example, assume the reference image set has 10 reference images, each with different feature vectors. At runtime, the similarity scoring component 814 can generate a similarity score for each of the 10 reference images that reflects a degree of similarity between the respective feature vectors of the reference images and the input image feature vector. The multiple reference harmonization component 804 can further harmonize each sub-image of the input image the corresponding reference sub-images using a weighting scheme for reference sub-images determined based on the similarity scores. For example, each of the 10 reference images will be decomposed into sub-images, resulting in groups of 10 sub-images corresponding to a same filter pass (e.g., 10 first reference sub-images, 10 second pass reference sub-images, etc.). The multiple reference harmonization component 804 can then harmonize the first pass sub-image for the input image with each of the 10 corresponding reference sub-images, using a weighting scheme for reference sub-images that give greater weight to sub-images associated with higher (e.g., more similar) similarity scores. The multiple reference harmonization component 804 can repeat this harmonization process for each sub-image and the corresponding group of reference sub-images to generate the modified sub-images.

In one implementation as applied to extend Equation 4 to multiple reference image harmonization, Equation 4 can transformed into Equation 5, wherein $sm(I(x), Ir^r(x))$ is the normalized similarity score between an input image and the $r^{th}$ reference image in the set. The similarity score can be the absolute correlation between the feature vector of the input image and the feature vector of the $r^{th}$ reference image.

$$I_{harm\_i}(x) = \sum_r sm(I(x), Ir^r(x)) * \left( mean(I_{ref\_i}(x)) + \frac{(I_{input\_i}(x) - mean\ (I_{input\_i}(x)) * std(I_{ref\_i}(x))}{std(I_{input\_i}(x))} \right)$$

Equation 5.

In Alternatively, in accordance with Equation 5, among the multiple references, the multiple reference harmonization component 804 can apply a similarity metric of 1.0 to the most similar vector and 0 to all others, resulting in harmonization of the input image to only the closest matching reference image.

Figure 9:
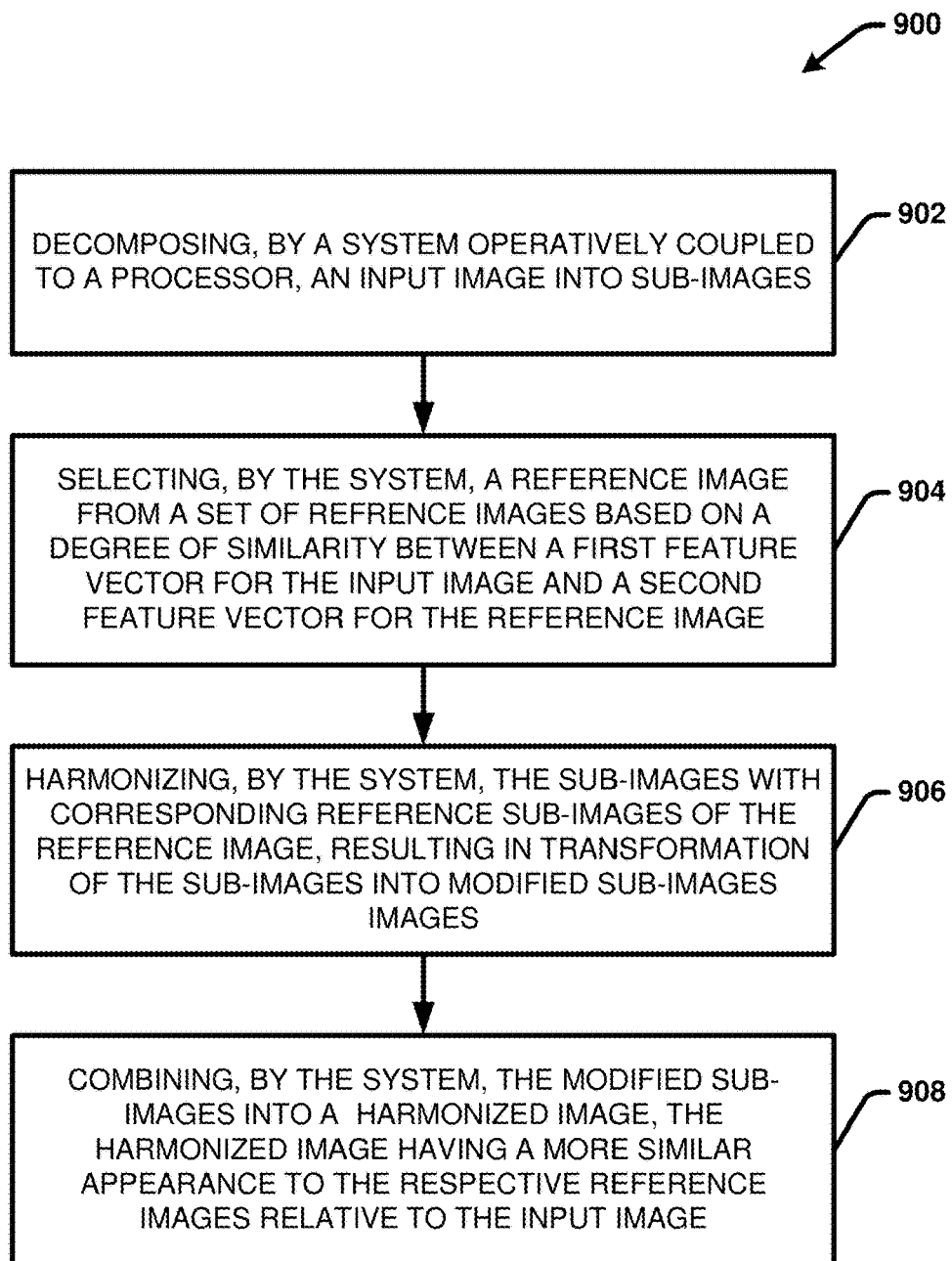
FIG. 9 illustrates an example, high-level flow diagram of another computer-implemented process for image harmonization in accordance with one or more embodiments of the disclosed subject matter.

FIG. 9 illustrates an example, high-level flow diagram of another computer-implemented process 900 for image harmonization in accordance with one or more embodiments of the disclosed subject matter. Repetitive description of like elements employed in respective embodiments is omitted for sake of brevity.

At 902, method 900 comprises decomposing, by a system operatively coupled to a processor (e.g., system 800), an input image (e.g., input image 102, input image 302 or the like) into sub-images (e.g., sub-images 304 using decomposition component 106). At 904, method 900 comprises selecting, by the system (e.g., using reference image selection component 816), a reference image (e.g., reference image 306) from a set of reference images based on a degree of similarity between a first feature vector for the input image and a second feature vector for the reference image. At 906, method 900 comprises harmonizing (e.g., using single reference harmonization component 802) the sub-images with corresponding reference sub-images (e.g., reference sub-images 308) of the reference image, resulting in transformation of the sub-images into modified sub-images (e.g., modified sub-images 310). At 908, method 900 comprises combining (e.g., using the reconstruction component 110) the modified sub-images into a harmonized image (e.g., harmonized image 312), the harmonized image having a more similar appearance to the reference image relative to the input image.

Figure 10:
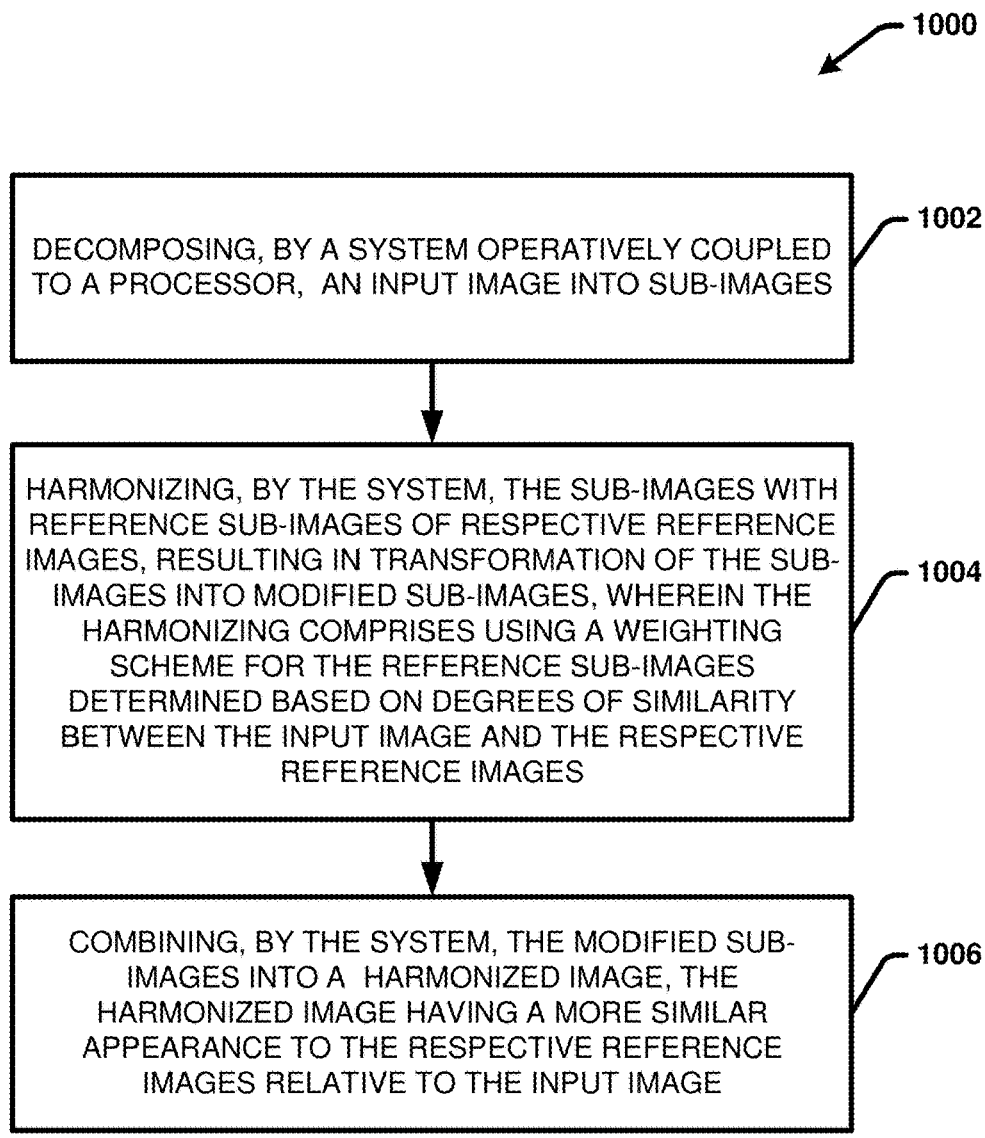
FIG. 10 illustrates an example, high-level flow diagram of another computer-implemented process for image harmonization in accordance with one or more embodiments of the disclosed subject matter.

FIG. 10 illustrates an example, high-level flow diagram of another computer-implemented process 1000 for image harmonization in accordance with one or more embodiments of the disclosed subject matter. Repetitive description of like elements employed in respective embodiments is omitted for sake of brevity.

At 1002, method 1000 comprises decomposing, by a system operatively coupled to a processor (e.g., system 800), an input image (e.g., input image 102, input image 302 or the like) into sub-images (e.g., sub-images 304 using decomposition component 106). At 1004, method 900 comprises harmonizing, by the system, the sub-images with reference sub-images of respective reference images (e.g., using multiple reference harmonization component 804), resulting in transformation of the sub-images into modified sub-images, wherein the harmonizing comprises using a weighting scheme for the reference sub-images determined based on degrees of similarity between the input image and the respective reference images. At 1008, method 1000 comprises combining (e.g., using the reconstruction component 110) the modified sub-images into a harmonized image, the harmonized image having a more similar appearance to the respective reference images relative to the input image.

Figure 11:
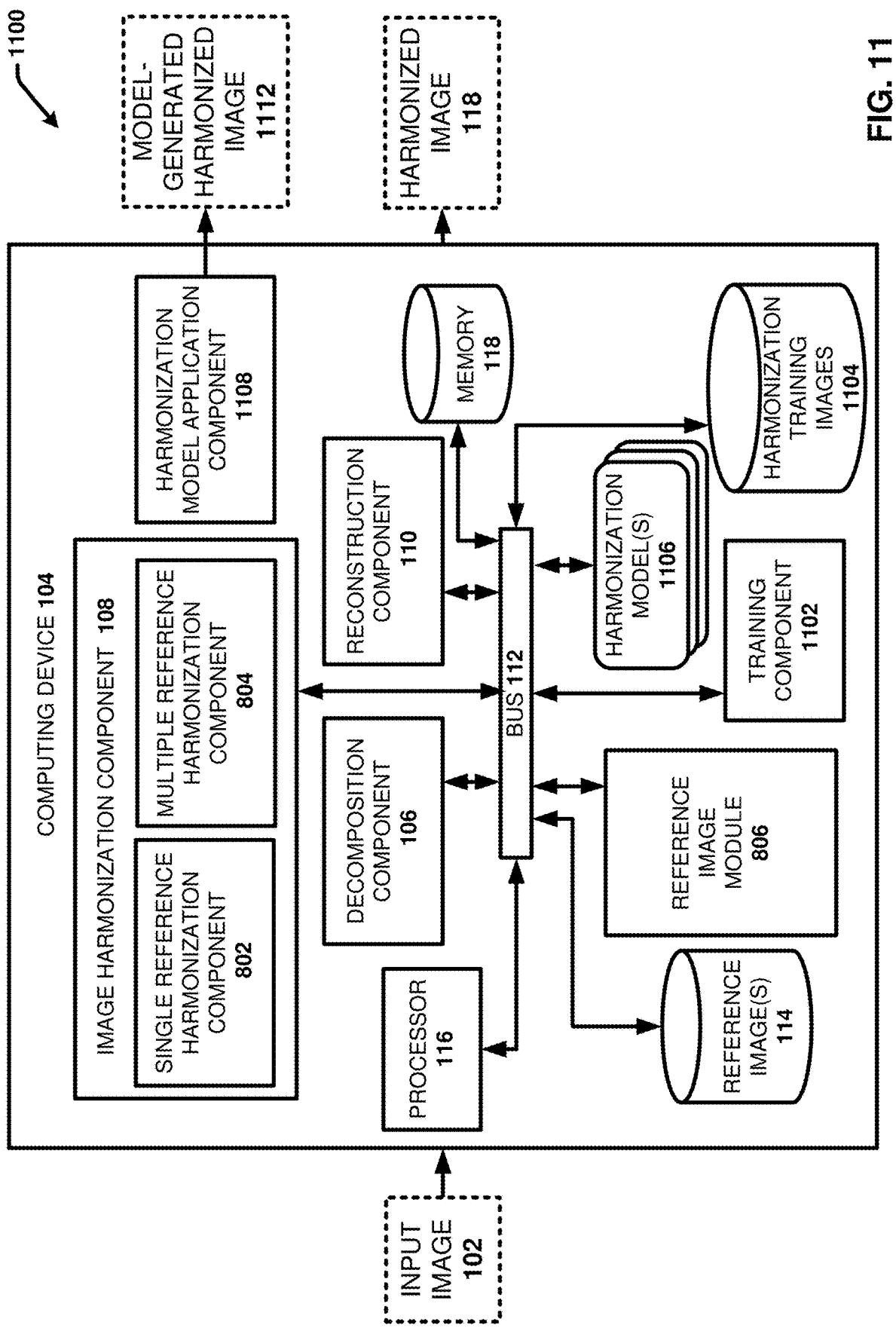
FIG. 11 illustrates a block diagram of another example, non-limiting system that facilitates image harmonization for deep learning model optimization in accordance with one or more embodiments of the disclosed subject matter.

FIG. 11 illustrates a block diagram of another example, non-limiting system 1100 that facilitates pre-processing image harmonization for deep learning model optimization in accordance with one or more embodiments of the disclosed subject matter. System 1100 includes same or similar components as system 800 with the addition of training component 1102, harmonization training images 1104, one or more harmonization models, and harmonization model application component 1108. Repetitive description of like elements employed in respective embodiments is omitted for sake of brevity.

System 1100 provides a deep learning extension to the above described image harmonization techniques described above. In particular, system 1100 uses harmonized images and/or modified sub-images generated in accordance with the harmonization techniques described above as ground-truth training samples for training one or more ML/AI models to transform input images with appearance variations into harmonized images (e.g., harmonized with an image processing model's training dataset) prior to input into the image processing model. Such ML/AI models are referred to herein as image harmonization models 1106. For example, the one or more image harmonization models 1106 can comprise one or more deep learning models, such an autoencoder, a generative adversarial autoencoder, a generative adversarial network (GAN), or the like. With these embodiments, once trained, the one or more image harmonization models 1102 can be applied to new input images (not shown) by the harmonization model application component 1108 to transform new input images with different feature variations into harmonized images that have a more similar appearance to the original source training images.

In this regard, system 1100 can include a plurality of harmonization training images 1104 that can include a diverse set of variational images with feature variations relative to the original source domain images used to train/develop a particular image processing model. For example, the harmonization training images 1104 can include a plurality of images of the same type as the source domain images (e.g., both being CXR images) yet from one or more different domains relative to the source images. At least some of these diverse variational harmonization images 1104 can processed using the image harmonization techniques described above to generate harmonized images for the respective harmonization training images. For example, all (or some) of the harmonization training image 1104 (or at least some) can be decomposed into sub-images by the decomposition component 106, harmonized with corresponding reference sub-images by the image harmonization component 108 and recombined into harmonized images (such as harmonized image 118) by the reconstruction component 110 in accordance with the techniques described above. These harmonization training image/harmonized image pairs and/or sub-image/modified sub-image pairs can also be stored with the harmonization training images 1104 and the training component 1102 can use them as the ground-truth training samples for training one or harmonization models 1106. In some implementations, the harmonization training images 1104 can also include at least some images that without ground-truth samples (e.g., that have not been processed to generate ground-truth harmonized images).

The disclosed techniques for developing and applying one or more image harmonization models 1106 provide a highly efficient end-to-end process for image harmonization as the mechanism for generating the ground-truth training data is automated. In this regard, one major limitation in ML/AI model development is the availability of ground-truth training data, which most often requires manual annotation, a tedious and costly endeavor. With the disclosed techniques, the ground-truth training data can be generated without any manual intervention, thus providing for limitless, low-cost, and efficient ground-truth training data generation. In addition, the usage of a trained image harmonization model to transform input images into harmonized images reduces the overall processing time for image harmonization relative to above described decomposition, sub-image harmonization and reconstruction process described above.

The harmonization model-based image harmonization techniques include two different approaches; a full image approach and a sub-image approach. The full image approach is described in greater detail with reference to FIG. 12 and the sub-image approach is described in greater detail with reference to FIGS. 13A and 13B.

Figure 12:
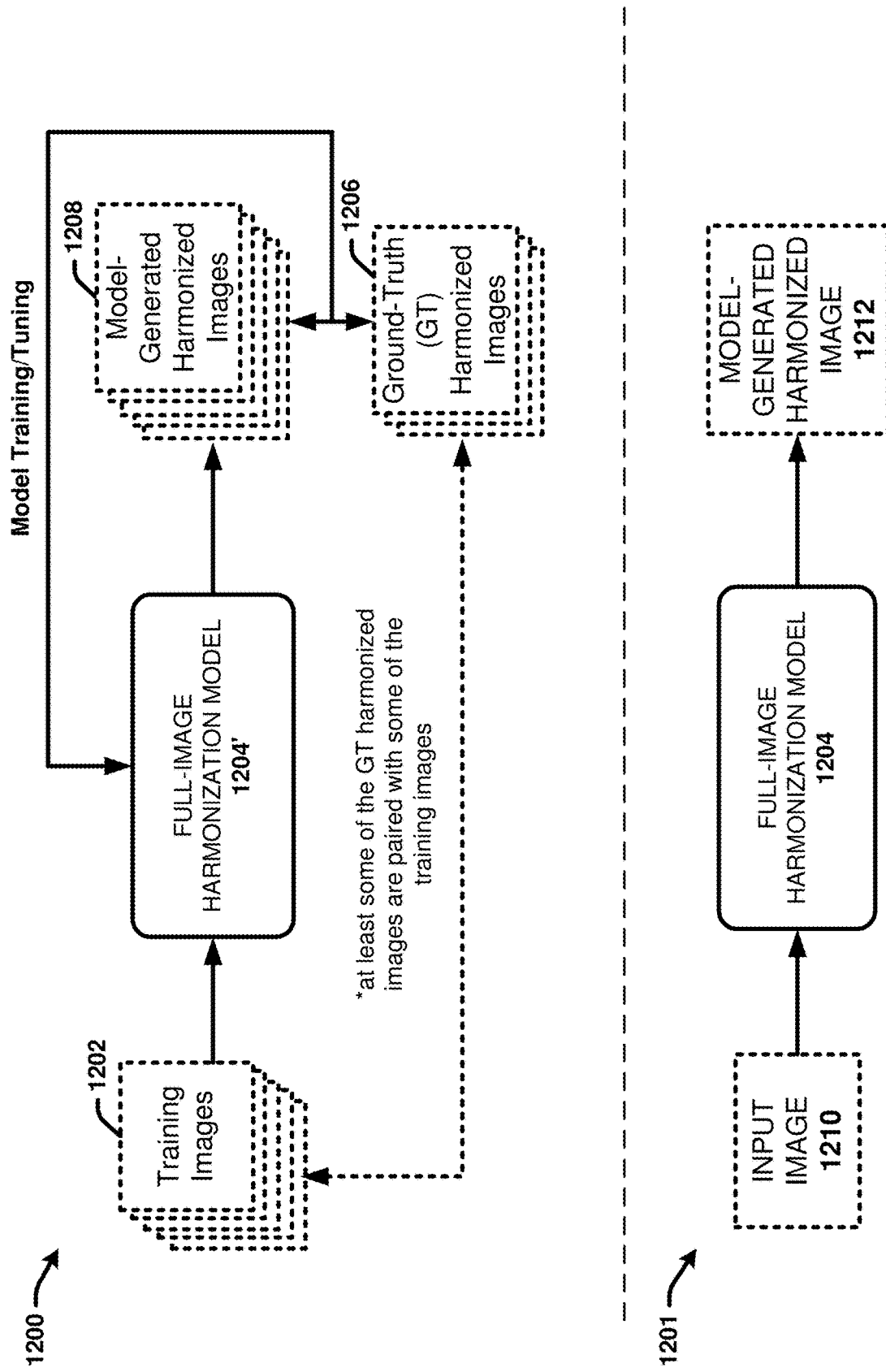
FIG. 12 illustrates training and usage of a full-image harmonization model in accordance with one or more embodiments of the disclosed subject matter.

In this regard, FIG. 12 illustrates training and usage of an image full-image harmonization model 1204 in accordance with the full image approach. In particular, process 1200 illustrates model training and process 1201 illustrates application of the trained model to a new input image (e.g., input image 1210) to generate a model generated (MG) harmonized image 1212. With reference to process 1200, in accordance with the full image approach, the training images 1202 can include a plurality of variational images (e.g., with appearance variations relative to source domain images used to train a particular image processing model). At least some of the training images 1202 have ground-truth harmonized images generated therefore using the image harmonization techniques described above. In this regard, each of the ground-truth harmonized image 1206 is a harmonized image that was generated for a corresponding training image 1202 using the decomposition component 106, the image harmonization component 108 and the reconstruction component 110. In accordance with this full image approach, the sub-images and corresponding modified sub-images generated for each of the training images 1202 during the image harmonization process can be discarded.

The type of the image full-image harmonization model 1204 can vary and thus the training process employed by the training component 1102 to train the image full-image harmonization model 1204 can also vary. At a high level, the training process involves training the full-image harmonization model 1204 to transform the training image 1202 with ground-truth harmonized images into their ground-truth harmonized images. More particularly, the training process involves applying the full-image harmonization model 1204 to the training images 1202 to generate model generated harmonized images 1206. The ground-truth harmonized training images 1206 are further compared to the model generated harmonized images 1208 and the full-image harmonization model 1204 parameters are then tuned based on the differences between the ground-truth harmonized images 1206 and the model generated harmonized images 1208. For example, in one implementation, the full-image harmonization model 1204 can comprises a generative model followed by a discriminator and the training can involve unsupervised and/or semi-supervised training.

In the embodiment shown, an asterisk (e.g., harmonization model 204') is used to indicate the harmonization model is being trained. The asterisk is removed in process 1201 to indicate the model training is complete. In this regard, after the full-image harmonization model 1204 has be trained, the harmonization model application component 1108 can apply the harmonization model to new input images (e.g., input image 1210) to transform it into a model generated harmonized image 1212 having a greater degree of similarity in appearance to the source domain images relative to the input image 1210.

Figure 13A:
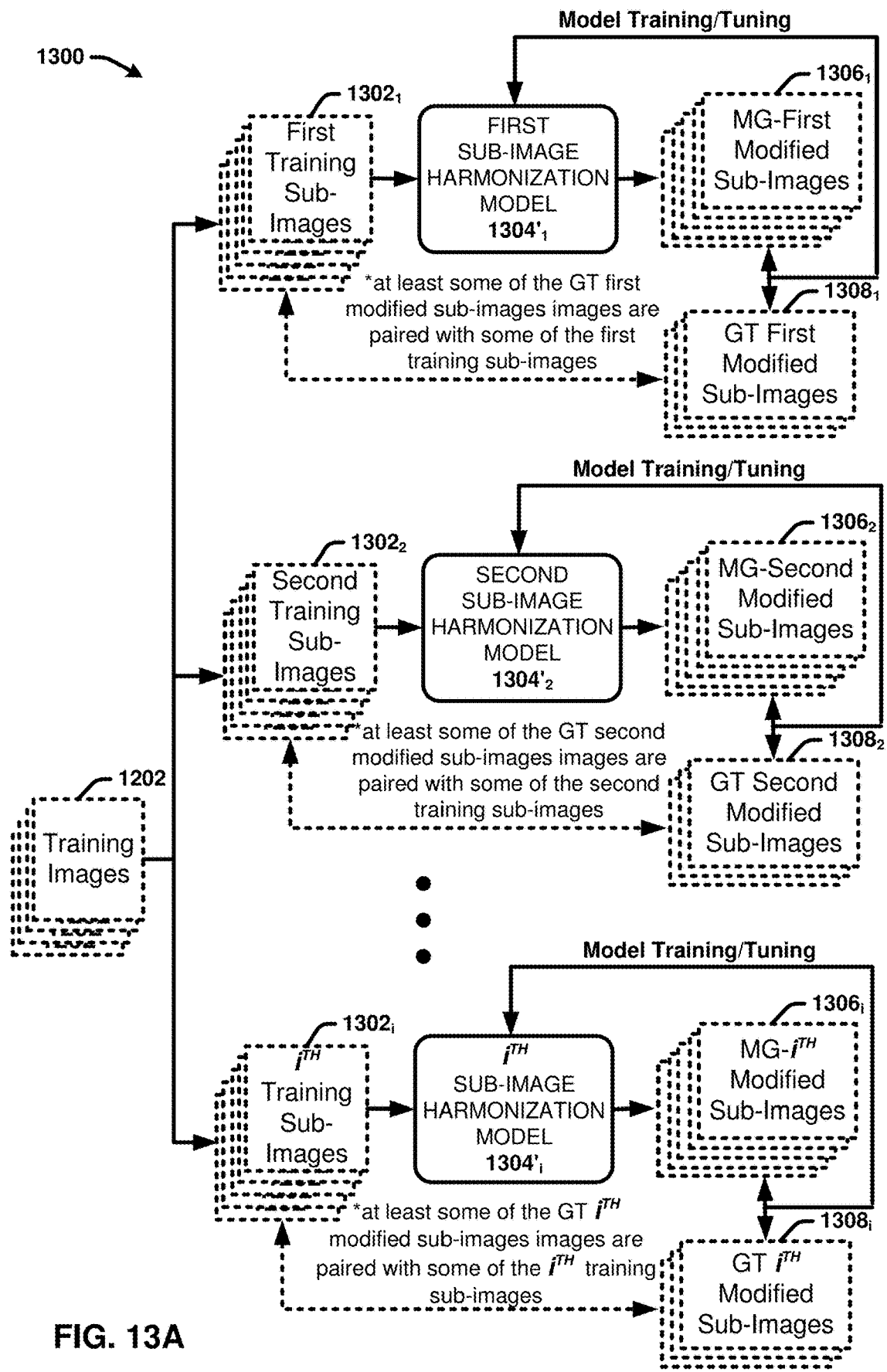
FIG. 13A illustrates training of sub-image harmonization models for image harmonization in accordance with one or more embodiments of the disclosed subject matter.

FIG. 13A illustrates an example process 1300 for training sub-image harmonization models $1304_{1-i}$, in accordance with the sub-image model-based harmonization approach. In accordance with the sub-image approach, a separate sub-image harmonization model can be trained for each group of related sub-images to transform them into modified sub-images. With this embodiment, the groups of sub-images and corresponding modified sub-images generated for each of the training images 1202 during the image harmonization process are used as the ground-truth training samples.

For example, as shown in process 1300, each of the training images 1202 can be decomposed into different sub-images (e.g., different energy band images) in accordance with the decomposition techniques described with reference to the decomposition component 106. For example, a single training image can be decomposed into a first training sub-image, a second training sub-image and so on up until the $i^{th}$ sub-image (wherein i=1, 2 . . . , B). In the embodiment shown, the sub-images of a same type can be grouped together as separate groups (e.g., the first pass sub-images grouped together, the second pass-sub images grouped together, and so on). For example, in the embodiment shown, the different groups of sub-images are respectively identified as first training sub-images $1301_1$, second training sub-images $1302_2$, and so on up to the $i^{th}$ group. At least some of the sub-images in each training can be processed using the image harmonization techniques of the image harmonization component 108 to generate modified sub-images for the corresponding sub-images. For example, in the embodiment shown, each group of sub-images has at least some ground-truth (GT) modified sub-images (e.g., GT first modified sub-images $1308_1$, GT second modified sub-images $1308_2$ and so on). These GT modified sub-images can be used as the ground-truth for training separate sub-image harmonization models 1304 to transform the sub-images of a particular group into model generated modified sub-images 1306. For example, a first sub-image harmonization model 1304₁, can be trained to transform the first training sub-images 1302₁ into MG-first modified sub-images 1306₁ using the GT first modified sub-images 1308₁ as the ground-truth. A second sub-image harmonization model 1304₂, can be trained to transform the second training sub-images 1302₂ into MG-second modified sub-images 1306₂ using the GT second modified sub-images 1308₂ as the ground-truth. This process can be repeated for each of the sub-image groups up to the $i^{th}$ group.

The type of the sub-image image full-image harmonization model 1204 can vary and thus the training process employed by the training component 1102 to train the image sub-image harmonization model 1304 can also vary. At a high level, the training process can involve applying the sub-harmonization model 1304ᵢ to its training sub-images 1302ᵢ to generate model generated harmonized modified sub-images 1306ᵢ. The ground-truth modified training sub-images 1308ᵢ are further compared to the model output and the sub-image harmonization model 1304ᵢ parameters are then tuned based on the differences between the ground-truth modified sub-images 1308ᵢ and the model generated modified sub-images 1306ᵢ. For example, in one implementation, the sub-image harmonization models 1304 can comprise generative models followed by a discriminator and the training can involve unsupervised and/or semi-supervised training.

Figure 13B:
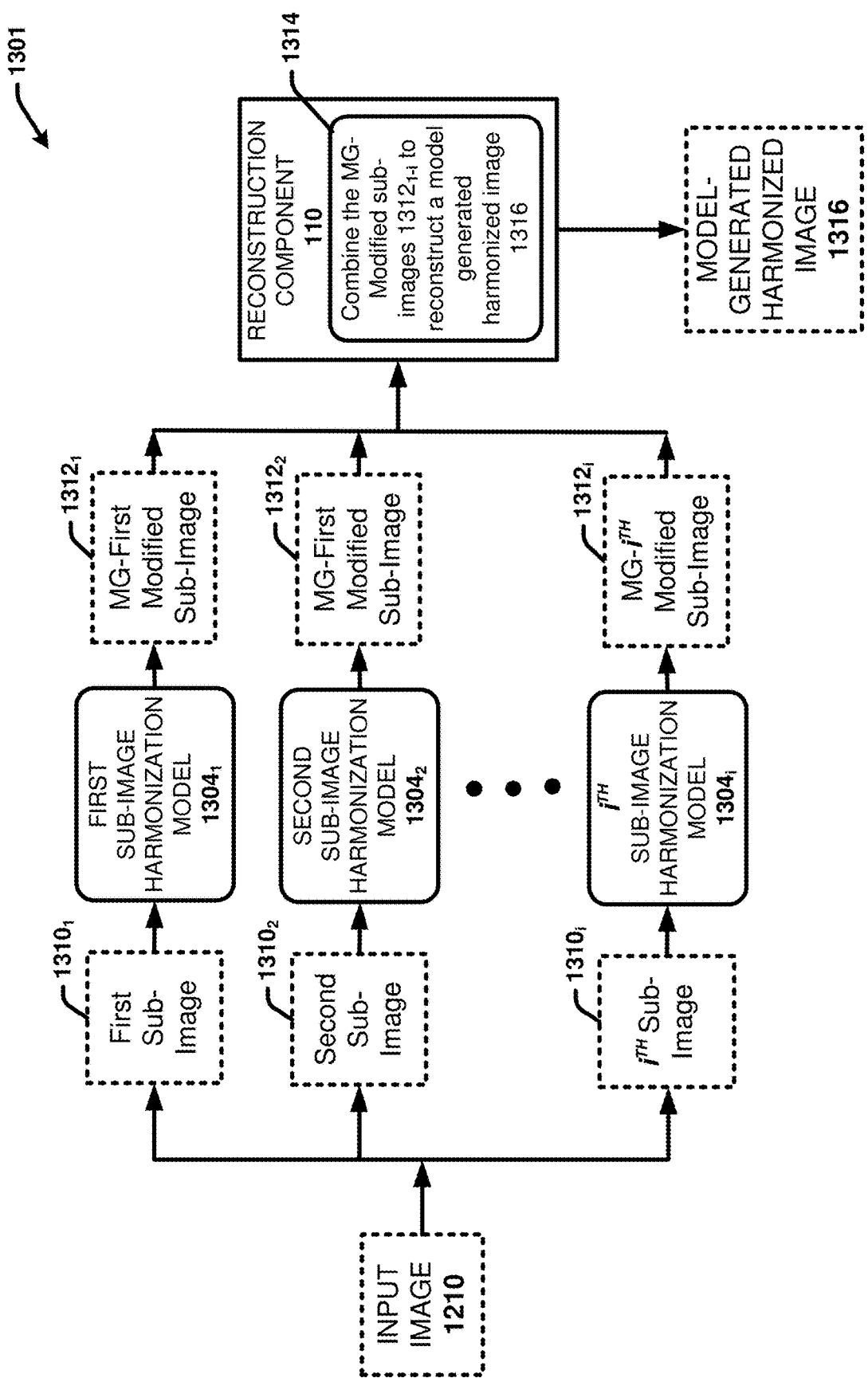
FIG. 13B illustrates application of sub-image harmonization models for image harmonization in accordance with one or more embodiments of the disclosed subject matter.

With reference now to FIG. 13B, process 1301 illustrates application of the (trained) sub-image harmonization models 1304 for pre-processing image harmonization in accordance with one or more embodiments of the disclosed subject matter. In the embodiment shown in FIG. 13A, an asterisk (e.g., sub-image harmonization model 1304') is used to indicate the sub-image harmonization model is being trained. The asterisk is removed in process 1301 to indicate the model training is complete. In this regard, after the sub-image harmonization models 1304₁₋ᵢ have be trained, the decomposition component 106 can decompose a new input image 1208 into sub images, respectively identified in process 1301 as sub-images 1310₁₋ᵢ. The harmonization model application component 1108 can further apply the respective sub-image harmonization models 1304 to their appropriate sub-images 1310₁₋ᵢ to transform the respective sub-images 1310₁₋ᵢ into model generated modified sub-images 1312₁₋ᵢ. At 1304, the reconstruction component 110 can then combine the model generated modified sub-images 1312₁₋ᵢ to reconstruct a model generated harmonized image 1316 having a greater degree of similarity in appearance to the source domain images relative to the input image 1210.

Figure 14:
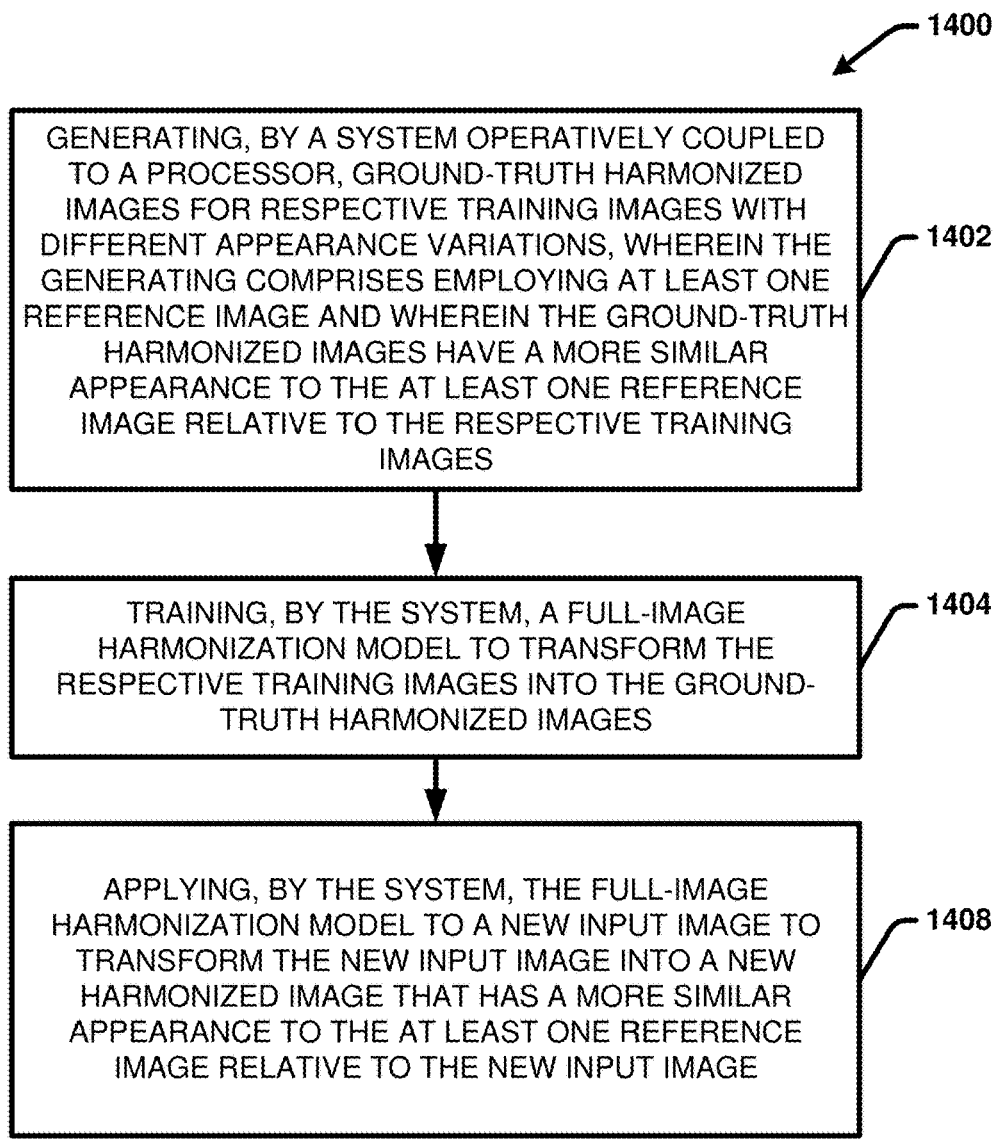
FIG. 14 illustrates an example, high-level flow diagram of a computer-implemented process for image harmonization using a full-image harmonization model in accordance with one or more embodiments of the disclosed subject matter.

FIG. 14 illustrates an example, high-level flow diagram of a computer-implemented process 1400 for image harmonization using a full-image harmonization model in accordance with one or more embodiments of the disclosed subject matter. Repetitive description of like elements employed in respective embodiments is omitted for sake of brevity.

At 1402, method 1400 comprises generating, by a system operatively coupled to a processor (e.g., system 1100), ground-truth harmonized images (e.g., ground-truth harmonized images 1206) for respective training images (e.g., training images 1202) with different appearance variations (e.g., using single reference harmonization component 802 or multiple reference harmonization component 804), wherein the generating comprises employing at least one reference image and wherein the ground-truth harmonized images have a more similar appearance to the at least one reference image relative to the respective training images. Additional details regarding an example process for generating the ground-truth harmonized images are described below with reference to process 1500 and operations 1502-1506. At 1404, method 1400 further comprises training, by the system (e.g., using training component 1102), a full-image harmonization model (e.g., full-image harmonization model 1204) to transform the respective training images into the ground-truth harmonized images. At 1406, method 1400 further comprises applying, by the system (e.g., using harmonization model application component 1108), the full-image harmonization model to a new input image (e.g., input image 1210) to transform the new input image into a new harmonized image (e.g., model-generated harmonized image 1210) that has a more similar appearance to the at least one reference image relative to the new input image.

Figure 15:
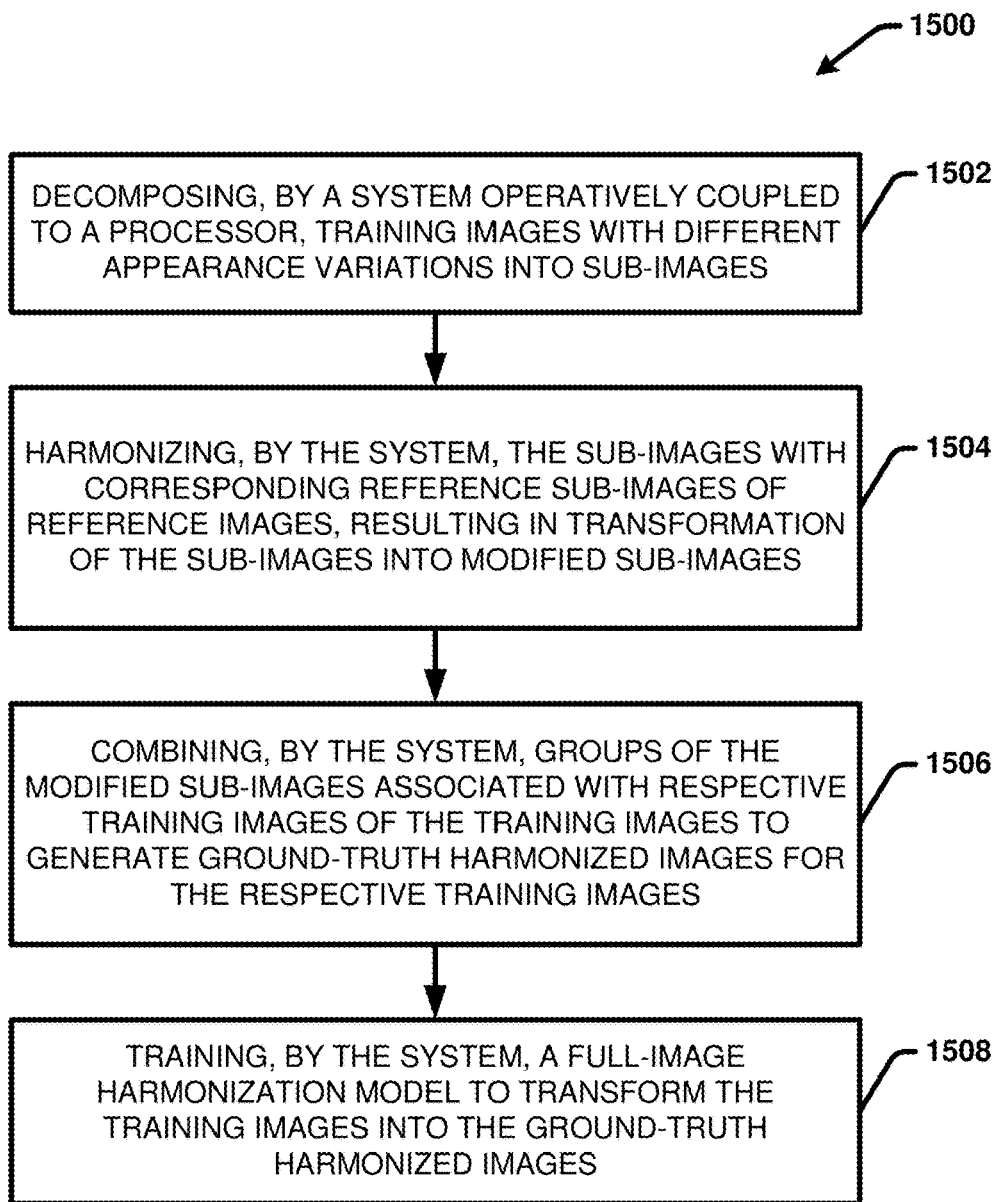
FIG. 15 illustrates an example, high-level flow diagram of a computer-implemented process for developing a full-image harmonization model in accordance with one or more embodiments of the disclosed subject matter.

FIG. 15 illustrates an example, high-level flow diagram of a computer-implemented process 1500 for developing a full-image harmonization model in accordance with one or more embodiments of the disclosed subject matter. Repetitive description of like elements employed in respective embodiments is omitted for sake of brevity.

At 1502, method 1500 comprises decomposing (e.g., using decomposition component 106), by a system operatively coupled to a processor (e.g., system 1100), training images (e.g., training images 1202) with different appearance variations into sub-images (e.g., training sub-images 1302₁₋ᵢ). At 1504, method 1500 comprises harmonizing, by the system, the sub-images with corresponding reference sub-images of reference images resulting in transformation of the sub-images into modified sub-images (e.g., the ground-truth modified sub-images 1308₁₋ᵢ), using the techniques described above with reference to the image harmonization component 108 (e.g., using single reference harmonization component 802 or multiple reference harmonization component 804). At 1506, method 1500 further comprises combining, by the system, groups of the modified sub-images associated with respective training images of the training images to generate ground-truth harmonized images (e.g., ground-truth harmonized images 1206) for the respective training images (e.g., using reconstruction component 110). For example, as described with reference to FIGS. 3 and 11, each training image is decomposed into a group of sub-images (e.g., sub-images 304) which are then transformed into modified sub-images (e.g., modified sub-images 310) using corresponding reference sub-images (e.g., reference sub-images 308) and the image harmonization techniques described with reference to the image harmonization component 108. The group of modified sub-images (e.g., modified sub-images 310) are then combined by the reconstruction component 110 to generate a ground-truth harmonized image (e.g., harmonized image 312) for the training image. At 1508, method 1500 further comprises training, by the system (e.g., using training component 1102), a full-image harmonization model (e.g., full-image harmonization model 1204) to transform the training images into the ground-truth harmonized images, as described with reference to FIG. 12 and process 1200.

Figure 16:
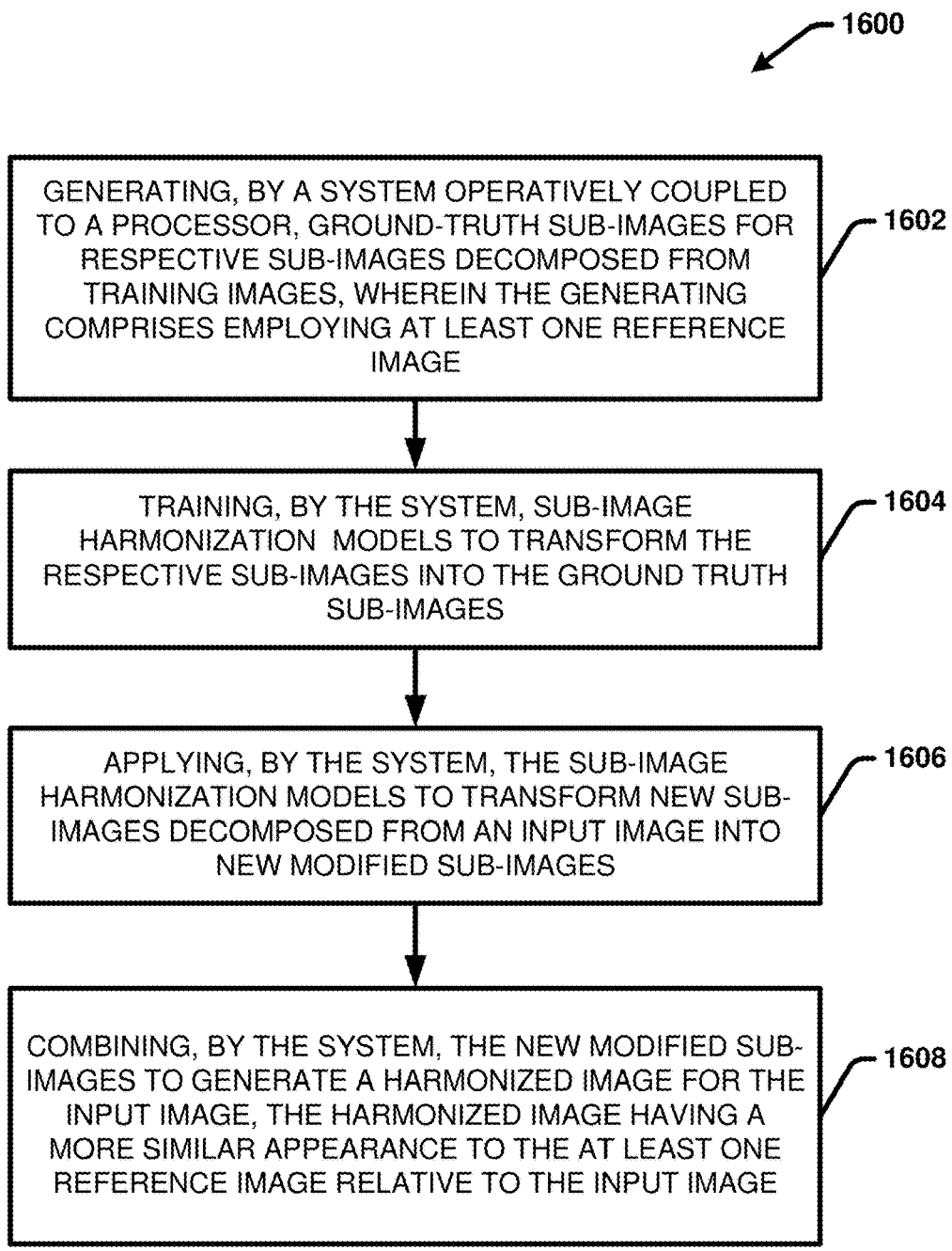
FIG. 16 illustrates an example, high-level flow diagram of a computer-implemented process for image harmonization using sub-image harmonization models in accordance with one or more embodiments of the disclosed subject matter.

FIG. 16 illustrates an example, high-level flow diagram of a computer-implemented process 1600 for image harmonization using sub-image harmonization models in accordance with one or more embodiments of the disclosed subject matter. Repetitive description of like elements employed in respective embodiments is omitted for sake of brevity.

At 1602, method 6100 comprises generating, by a system operatively coupled to a processor (e.g., system 1100), ground-truth sub-images (e.g., ground-truth modified sub-images 1308₁₋ᵢ) for respective sub-images (e.g., training sub-images $1302_{1-i}$) decomposed from training images (e.g., training images 1202), wherein the generating comprise employing at least one reference image. For example, the generation of the modified sub-images can be performed by the decomposition component 106 and image harmonization component 108 in accordance with operations 1502-1504 of process 1500, (e.g., by harmonizing the sub-images with corresponding reference sub-images, resulting in a transformation of the sub-images into the ground-truth sub-images). At 1604, method 1600 further comprises training, by the system, sub-image harmonization models (e.g., sub-image harmonization models $1304_{1-i}$) to transform the sub-images into the ground-truth sub-images (e.g., using training component 1102), as described with reference to FIG. 13A and process 1300.

At 1608, method 1600 further comprises applying, by the system (e.g., using the harmonization model application component 1108), the sub-image machine learning models to transform new sub-images (e.g., sub-images $1310_{1-i}$) decomposed from an input image (e.g., input image 1210) into new modified sub-images (e.g., model-generated modified sub-images $1312_{1-i}$), as described with reference to FIG. 13B and process 1301. At 1610, method 1600 comprises combining, by the system (e.g., using reconstruction component 110), the new modified sub-images to generate a harmonized image (model-generated harmonized image 1316) for the input image, the harmonized image having a more similar appearance to the at least one reference images relative to the input image.

Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 17, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 17:
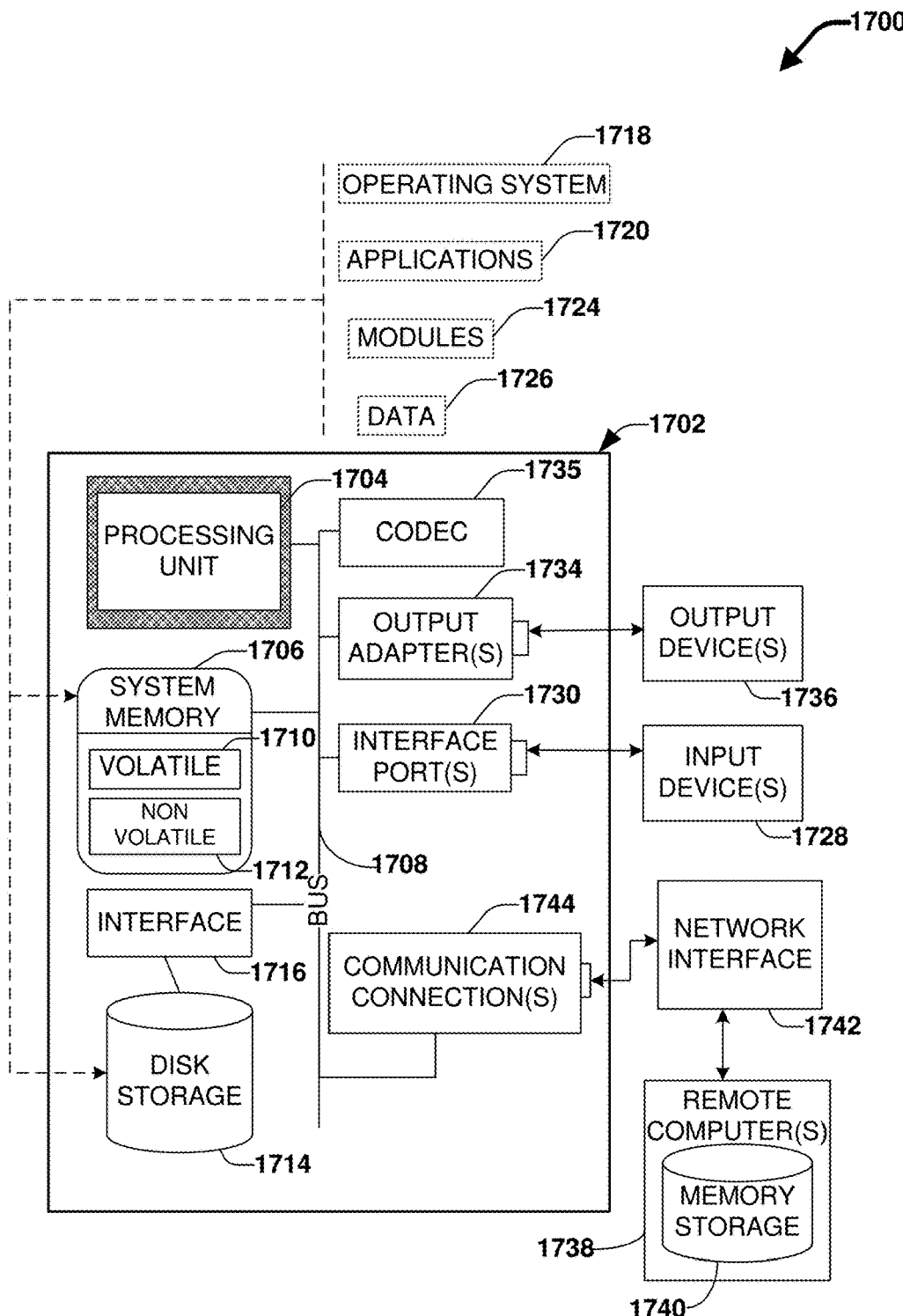
FIG. 17 illustrates a block diagram of an example, non-limiting operating environment in which one or more embodiments described herein can be facilitated.

With reference to FIG. 17, an example environment 1700 for implementing various aspects of the claimed subject matter includes a computer 1702. The computer 1702 includes a processing unit 1704, a system memory 1706, a codec 1735, and a system bus 1708. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704.

The system bus 1708 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1706 includes volatile memory 1710 and non-volatile memory 1712, which can employ one or more of the disclosed memory architectures, in various embodiments. The basic input/output system (BIOS), containing the basic routines to transfer information between elements within the computer 1702, such as during start-up, is stored in non-volatile memory 1712. In addition, according to present innovations, codec 1735 can include at least one of an encoder or decoder, wherein the at least one of an encoder or decoder can consist of hardware, software, or a combination of hardware and software. Although, codec 1735 is depicted as a separate component, codec 1735 can be contained within non-volatile memory 1712. By way of illustration, and not limitation, non-volatile memory 1712 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1712 can employ one or more of the disclosed memory devices, in at least some embodiments. Moreover, non-volatile memory 1712 can be computer memory (e.g., physically integrated with computer 1702 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1710 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1702 can also include removable/non-removable, volatile/non-volatile computer storage medium. FIG. 17 illustrates, for example, disk storage 1714. Disk storage 1714 includes, but is not limited to, devices like a magnetic disk drive, solid state disk (SSD), flash memory card, or memory stick. In addition, disk storage 1714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1714 to the system bus 1708, a removable or non-removable interface is typically used, such as interface 1716. It is appreciated that disk storage 1714 can store information related to a user. Such information might be stored at or provided to a server or to an application running on a user device. In one embodiment, the user can be notified (e.g., by way of output device(s) 1736) of the types of information that are stored to disk storage 1714 or transmitted to the server or application. The user can be provided the opportunity to opt-in or opt-out of having such information collected or shared with the server or application (e.g., by way of input from input device(s) 1728).

It is to be appreciated that FIG. 17 describes software that acts as an intermediary between users and the basic computer resources described in the suitable operating environment 1700. Such software includes an operating system 1718. Operating system 1718, which can be stored on disk storage 1714, acts to control and allocate resources of the computer 1702. Applications 1720 take advantage of the management of resources by operating system 1718 through program modules 1724, and program data 1726, such as the boot/shutdown transaction table and the like, stored either in system memory 1706 or on disk storage 1714. It is to be appreciated that the claimed subject matter can be implemented with various operating systems or combinations of operating systems.

A user enters commands or information into the computer 1702 through input device(s) 1728. Input devices 1728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1736 use some of the same type of ports as input device(s) 1728. Thus, for example, a USB port can be used to provide input to computer 1702 and to output information from computer 1702 to an output device 1736. Output adapter 1734 is provided to illustrate that there are some output devices 1736 like monitors, speakers, and printers, among other output devices 1736, which require special adapters. The output adapters 1734 include, by way of illustration and not limitation, video and sound cards that provide a means of connection between the output device 1736 and the system bus 1708. It should be noted that other devices or systems of devices provide both input and output capabilities such as remote computer(s) 1738.

Computer 1702 can operate in a networked environment using logical connections to one or more remote computers, such as remote computer(s) 1738. The remote computer(s) 1738 can be a personal computer, a server, a router, a network PC, a workstation, a microprocessor based appliance, a peer device, a smart phone, a tablet, or other network node, and typically includes many of the elements described relative to computer 1702. For purposes of brevity, only a memory storage device 1740 is illustrated with remote computer(s) 1738. Remote computer(s) 1738 is logically connected to computer 1702 through a network interface 1742 and then connected via communication connection(s) 1744. Network interface 1742 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1744 refers to the hardware/software employed to connect the network interface 1742 to the bus 1708. While communication connection 1744 is shown for illustrative clarity inside computer 1702, it can also be external to computer 1702. The hardware/software necessary for connection to the network interface 1742 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      an image decomposition component that decomposes an input image into sub-images;
      a reference image set generation component that selects a plurality of reference images from a set of candidate reference images based on measures of similarity between each of the reference images of the plurality and the input image, wherein each of the reference images comprises reference sub-images decomposed therefrom; and
      a harmonization component that harmonizes the sub-images with the reference sub-images of each of the reference images resulting in transformation of the sub-images into modified sub-images, wherein the harmonization component harmonizes the sub-images with the reference sub-images of each of the reference images using a weighting scheme for the reference sub-images determined based on the measures of similarity.

2. The system of claim 1, wherein the computer executable components further comprise:
   a reconstruction component that combines the modified sub-images into a harmonized image, the harmonized image having a more similar appearance to at least one of the reference images images relative to the input image.

3. The system of claim 1, wherein the harmonization component harmonizes the sub-images with the reference sub-images based on two or more statistical values respectively calculated for each of the sub-images and each of the reference sub-images.

4. The system of claim 3, wherein the sub-images comprise energy band images and the reference sub-images comprise corresponding reference energy band images, and wherein the two or more different statistical values are selected from a group consisting of: means of energy band image intensity values of the energy band images and the corresponding reference energy band images, standard deviations of the energy band image intensity values, percentiles of the energy band image intensity values, and histograms of the energy band image intensity values.

5. The system of claim 1, wherein the measures of similarity are based on comparison of a first feature vector determined for the input image and second feature vectors respectively determined for each of the reference images.

6. The system of claim 5, wherein the sub-images comprise energy band images and the reference sub-images comprise corresponding reference energy band images, and wherein the first feature vector and the second feature vectors are respectively based on statistical values calculated based on respective energy band image intensity values associated with the energy band images and the corresponding reference energy band images.

7. The system of claim 5, wherein the first feature vector and the second feature vectors are respectively based on output features generated based on application of a deep neural network model to the input image and the reference images, wherein the deep learning neural network model was trained on a corpus of images related to the input image and the reference images.

8. The system of claim 1, wherein the computer executable components further comprise:
a vectorization component that generates feature vectors for the candidate reference images and wherein the reference image set generation component selects the plurality of reference images from the candidate reference images based on differences between the feature vectors.

9. The system of claim 8, wherein the computer executable components further comprise:
clustering component that clusters the candidate reference images into different groups based on the differences between the feature vectors, and wherein the reference image set generation component selects one of the candidate references from each of the different groups as the reference images.

10. The system of claim 1, further comprising:
a training component uses the modified sub-images as ground-truth training samples to facilitate training one or more image harmonization model to transform the input image into a harmonized image that has a more similar appearance to at least one of the reference sub-images relative to the input image.

11. The system of claim 1, further comprising:
a training component uses the modified sub-images as ground-truth training samples to facilitate training one or more sub-image harmonization models to transform the sub-images into the modified sub-images.

12. The system of claim 11, further comprising:
a reconstruction component that combines the modified sub-images into a harmonized image, the harmonized image having a more similar appearance to the at least one of the reference images relative to the input image, and wherein the training component uses the harmonized image and additional harmonized images generated in a same manner as the harmonized image as additional ground-truth training samples to facilitate training a full-image harmonization model to transform input images into harmonized images that have a more similar appearance to the at least one of the reference images relative to the input images.

13. The system of claim 12, wherein the computer executable components further comprise:
a model application component that applies the full-image harmonization model to transform a new input image into a new harmonized image.

14. The system of claim 11, wherein the computer executable components further comprise:
a model application component that applies the one or more sub-image harmonization models to transform new sub-images decomposed from a new input image into new modified sub-images; and
a reconstruction component that combines the new modified sub-images to generate a harmonized image for the new input image, the harmonized image having a more similar appearance to at least one of the reference images relative to the new input image.

15. A method comprising:
decomposing, by a system operatively coupled to a processor, an input image into sub-images;
selecting, by the system, a plurality of reference images from a set of candidate reference images based on measures of similarity between each of the reference images of the plurality and the input image, wherein each of the reference images comprises reference sub-images decomposed therefrom; and
harmonizing, by the system, the sub-images with the reference sub-images of each of the reference images resulting in transformation of the sub-images into modified sub-images, wherein the harmonizing comprises using a weighting scheme for the reference sub-images of each of the reference images determined based on the measures of similarity.

16. The method of claim 15, further comprising:
combining, by the system, the modified sub-images into a harmonized image, the harmonized image having a more similar appearance to at least one of the reference images images relative to the input image.

17. The method of claim 15, further comprising:
employing, by the system, the modified sub-images as ground-truth training samples to facilitate training one or more image harmonization model to transform the input image into a harmonized image that has a more similar appearance to at least one of the reference sub-images relative to the input image.

18. The method of claim 15, further comprising:
employing, by the system, the modified sub-images as ground-truth training samples to facilitate training one or more sub-image harmonization models to transform the sub-images into the modified sub-images.

19. The method of claim 18, further comprising:
applying, by the system, the one or more sub-image harmonization models to transform new sub-images decomposed from a new input image into new modified sub-images; and
combining, by the system, the new modified sub-images to generate a harmonized image for the new input image, the harmonized image having a more similar appearance to at least one of the reference images relative to the new input image.

20. A non-transitory machine-readable storage medium, comprising executable instructions that, when executed by a processor, facilitate performance of operations, comprising:
decomposing an input image into sub-images;
selecting a plurality of reference images from a set of candidate reference images based on measures of similarity between each of the reference images of the plurality and the input image, wherein each of the reference images comprises reference sub-images decomposed therefrom; and
harmonizing the sub-images with the reference sub-images of each of the reference images resulting in transformation of the sub-images into modified sub-images, wherein the harmonizing comprises using a weighting scheme for the reference sub-images of each of the reference images determined based on the measures of similarity.

* * * * *